United States Patent
Alarcon-Luther et al.

(10) Patent No.: US 7,801,816 B2
(45) Date of Patent: Sep. 21, 2010

(54) SYSTEM AND METHOD FOR CURRENCY SELECTABLE STORED VALUE INSTRUMENT

(75) Inventors: Melissa Alarcon-Luther, Arlington, VA (US); Debra C. Fellner, Wilmington, DE (US); Barry M. Sabloff, Winnetka, IL (US); Frank Charles Schell, III, Chicago, IL (US); Peter Mark Mesrobian, Kenilworth, IL (US); Ginger Griffin, Winnetka, IL (US); Michelle Dorion, London (GB); Gus Karris, Hawthorn Woods, IL (US)

(73) Assignee: JP Morgan Chase Bank, N.A., New York, NY (US)

( * ) Notice: Subject to any disclaimer, the term of this patent is extended or adjusted under 35 U.S.C. 154(b) by 849 days.

(21) Appl. No.: 10/337,265

(22) Filed: Jan. 7, 2003

(65) Prior Publication Data
US 2003/0105714 A1   Jun. 5, 2003

Related U.S. Application Data

(62) Division of application No. 09/983,901, filed on Oct. 26, 2001, now Pat. No. 7,313,546.

(60) Provisional application No. 60/292,528, filed on May 23, 2001.

(51) Int. Cl.
*G06Q 40/00* (2006.01)
(52) U.S. Cl. .......................................... 705/41; 705/35
(58) Field of Classification Search ............... 70/14–80; 705/10–44
See application file for complete search history.

(56) References Cited

U.S. PATENT DOCUMENTS

| | | | |
|---|---|---|---|
| 3,230,650 | A | 1/1966 | Orkin |
| 3,634,669 | A | 1/1972 | Soumas |
| 3,713,235 | A | 1/1973 | Roberts |

(Continued)

FOREIGN PATENT DOCUMENTS

CA   2293321   12/1998

(Continued)

OTHER PUBLICATIONS

CardEx Incentives, Apr. 6, 1999, www.cardexco.com.

(Continued)

*Primary Examiner*—Frantzy Poinvil
(74) *Attorney, Agent, or Firm*—Hunton & Williams, LLP

(57) ABSTRACT

The invention provides a currency selectable stored value instrument, whose currency may be chosen or converted at the time value is loaded, after load but prior to redemption of value, at the time of redemption, or at other times. One embodiment of the system is configured so that the stored value instrument may be a plastic card with a magnetic stripe, compatible with card readers on Automated Teller Machines (ATMs) or other terminals. In one embodiment, U.S. dollars may be converted to Mexican pesos when the stored value instrument is loaded at an ATM or other location in the United States. A user may subsequently redeem that value for legal tender in pesos at an ATM located in Mexico, for example, or for goods, services, or cash in other currencies.

13 Claims, 4 Drawing Sheets

U.S. PATENT DOCUMENTS

| | | |
|---|---|---|
| 3,938,090 A | 2/1976 | Borison et al. |
| 3,946,206 A | 3/1976 | Darjany |
| 4,047,033 A | 9/1977 | Maimberg |
| 4,058,220 A | 11/1977 | Torongo |
| D248,203 S | 6/1978 | Morse |
| 4,123,747 A | 10/1978 | Lancto et al. |
| 4,130,881 A | 12/1978 | Haessler et al. |
| 4,205,780 A | 6/1980 | Burns |
| 4,264,808 A | 4/1981 | Owens et al. |
| 4,321,672 A | 3/1982 | Braun et al. |
| 4,338,587 A | 7/1982 | Chiappetti |
| 4,453,074 A | 6/1984 | Weinstein |
| 4,454,414 A | 6/1984 | Benton |
| 4,465,206 A | 8/1984 | Sorel et al. |
| 4,545,838 A | 10/1985 | Minkus |
| 4,575,621 A | 3/1986 | Dreifus |
| 4,582,985 A | 4/1986 | Lofberg |
| 4,605,844 A | 8/1986 | Haggan |
| 4,614,861 A | 9/1986 | Pavlov et al. |
| 4,634,845 A | 1/1987 | Riley |
| 4,643,452 A | 2/1987 | Chang et al. |
| 4,650,981 A | 3/1987 | Foletta |
| 4,669,730 A | 6/1987 | Small |
| 4,689,478 A | 8/1987 | Hale et al. |
| 4,697,072 A | 9/1987 | Kawana |
| 4,700,055 A | 10/1987 | Kashkashian, Jr. |
| 4,701,601 A | 10/1987 | Francini et al. |
| 4,723,212 A | 2/1988 | O'Brien |
| 4,746,787 A | 5/1988 | Okada |
| 4,750,119 A | 6/1988 | Robertson |
| 4,752,676 A | 6/1988 | Leonard et al. |
| 4,754,418 A | 6/1988 | Hara |
| 4,766,293 A * | 8/1988 | Boston ................. 705/41 |
| 4,766,539 A | 8/1988 | Fox |
| 4,789,928 A | 12/1988 | Fujisaki |
| 4,817,949 A | 4/1989 | Bachman et al. |
| 4,822,985 A | 4/1989 | Boggan et al. |
| 4,831,242 A | 5/1989 | Englehardt |
| 4,831,526 A | 5/1989 | Luchs |
| 4,837,422 A | 6/1989 | Dethloff et al. |
| 4,845,347 A | 7/1989 | McCrindle et al. |
| 4,859,837 A | 8/1989 | Halpern |
| 4,868,376 A | 9/1989 | Lessin et al. |
| 4,870,259 A | 9/1989 | Boggan et al. |
| 4,882,675 A | 11/1989 | Nichtberger et al. |
| 4,897,533 A | 1/1990 | Lyszczarz |
| D305,887 S | 2/1990 | Nishimura |
| 4,906,826 A | 3/1990 | Spencer |
| 4,908,521 A | 3/1990 | Boggan et al. |
| 4,910,672 A | 3/1990 | Off |
| 4,923,288 A | 5/1990 | Allen et al. |
| 4,928,001 A | 5/1990 | Masada |
| 4,941,090 A | 7/1990 | McCarthy |
| 4,943,707 A | 7/1990 | Boggan |
| 4,948,174 A | 8/1990 | Thomson et al. |
| 4,953,085 A | 8/1990 | Atkins |
| 4,954,985 A | 9/1990 | Yamazaki |
| 4,961,142 A | 10/1990 | Elliott et al. |
| 4,968,873 A | 11/1990 | Dethloff et al. |
| 4,975,840 A | 12/1990 | DeTore et al. |
| 4,977,501 A | 12/1990 | Lefevre |
| 4,978,401 A | 12/1990 | Bonomi |
| 4,992,940 A | 2/1991 | Dworkin |
| 5,025,139 A | 6/1991 | Halliburton, Jr. |
| 5,025,372 A | 6/1991 | Burton et al. |
| 5,049,728 A | 9/1991 | Rovin |
| 5,054,096 A | 10/1991 | Beizer |
| 5,055,662 A | 10/1991 | Hasegawa |
| 5,072,380 A | 12/1991 | Randelman et al. |
| 5,080,748 A | 1/1992 | Bonomi |
| 5,095,194 A | 3/1992 | Barbanell |
| 5,097,115 A | 3/1992 | Ogasawara et al. |
| 5,117,355 A | 5/1992 | McCarthy |
| 5,121,945 A | 6/1992 | Thomson et al. |
| 5,122,950 A | 6/1992 | Mee |
| 5,146,068 A | 9/1992 | Ugawa et al. |
| 5,163,098 A | 11/1992 | Dahbura |
| 5,175,416 A | 12/1992 | Mansvelt |
| 5,175,682 A | 12/1992 | Higashiyama |
| 5,177,342 A | 1/1993 | Adams |
| 5,180,901 A | 1/1993 | Hiramatsu |
| 5,185,697 A | 2/1993 | Jacobs et al. |
| 5,187,750 A | 2/1993 | Behera |
| 5,191,522 A | 3/1993 | Bosco et al. |
| 5,192,947 A | 3/1993 | Neustein |
| 5,201,010 A | 4/1993 | Gabriel |
| 5,202,286 A | 4/1993 | Nakatani |
| 5,202,826 A | 4/1993 | McCarthy |
| 5,206,488 A | 4/1993 | Teicher |
| 5,206,803 A | 4/1993 | Vitagliano |
| 5,214,700 A | 5/1993 | Pinkas et al. |
| 5,218,631 A | 6/1993 | Katz |
| 5,237,620 A | 8/1993 | Deaton |
| 5,247,190 A | 9/1993 | Friend et al. |
| 5,257,486 A | 11/1993 | Holmwall |
| 5,276,311 A | 1/1994 | Hartmut |
| 5,287,268 A | 2/1994 | McCarthy |
| 5,287,269 A | 2/1994 | Dorrough et al. |
| 5,297,026 A | 3/1994 | Hoffman |
| 5,311,594 A | 5/1994 | Penzias |
| 5,326,959 A | 7/1994 | Perazza |
| 5,326,960 A | 7/1994 | Tannenbaum |
| 5,328,809 A | 7/1994 | Holmes et al. |
| 5,339,239 A | 8/1994 | Manabe et al. |
| 5,349,633 A | 9/1994 | Katz |
| 5,350,906 A | 9/1994 | Brody et al. |
| 5,351,187 A | 9/1994 | Hassett |
| 5,352,877 A | 10/1994 | Morley |
| 5,359,183 A | 10/1994 | Skodlar |
| 5,361,062 A | 11/1994 | Weiss et al. |
| 5,365,575 A | 11/1994 | Katz |
| 5,382,784 A | 1/1995 | Eberhardt |
| 5,383,113 A | 1/1995 | Knight |
| 5,388,165 A | 2/1995 | Gabriel |
| 5,397,881 A | 3/1995 | Mannik |
| 5,399,502 A | 3/1995 | Friend et al. |
| 5,401,827 A | 3/1995 | Holmes et al. |
| RE34,915 E | 4/1995 | Nichtberger et al. |
| 5,412,190 A | 5/1995 | Kopesec |
| 5,412,192 A | 5/1995 | Hoss |
| 5,413,341 A | 5/1995 | Lieberman |
| 5,424,524 A | 6/1995 | Ruppert |
| 5,430,644 A | 7/1995 | Deaton et al. |
| 5,432,326 A | 7/1995 | Noblett et al. |
| 5,444,794 A | 8/1995 | Uhland |
| 5,448,471 A | 9/1995 | Deaton et al. |
| 5,450,477 A | 9/1995 | Amarant |
| 5,450,491 A | 9/1995 | McNair |
| 5,453,601 A | 9/1995 | Rosen |
| 5,455,407 A | 10/1995 | Rosen |
| 5,457,305 A | 10/1995 | Akel et al. |
| 5,459,306 A | 10/1995 | Stein et al. |
| 5,465,206 A | 11/1995 | Hilt |
| 5,466,919 A | 11/1995 | Henry |
| 5,466,920 A | 11/1995 | Nair et al. |
| 5,471,669 A | 11/1995 | Lidman |
| 5,477,038 A | 12/1995 | Levine |
| 5,477,040 A | 12/1995 | Lalonde |
| 5,479,494 A | 12/1995 | Clitherow |
| 5,481,094 A | 1/1996 | Suda |
| 5,482,139 A | 1/1996 | Rivalto |
| 5,483,444 A | 1/1996 | Malark |
| 5,483,445 A | 1/1996 | Pickering |
| 5,489,123 A | 2/1996 | Roshkoff |

| | | | | | |
|---|---|---|---|---|---|
| 5,500,514 A | 3/1996 | Veeneman | 5,726,884 A | 3/1998 | Sturgeon et al. |
| 5,500,890 A | 3/1996 | Rogge et al. | 5,727,153 A | 3/1998 | Powell |
| 5,503,891 A | 4/1996 | Marshall et al. | 5,728,998 A | 3/1998 | Novis et al. |
| 5,511,114 A | 4/1996 | Stimson et al. | 5,729,693 A | 3/1998 | Holda-Fleck |
| 5,512,654 A | 4/1996 | Holmes et al. | 5,732,136 A | 3/1998 | Murphree et al. |
| 5,513,102 A | 4/1996 | Auriemma | 5,734,154 A | 3/1998 | Jachimowicz et al. |
| 5,521,363 A | 5/1996 | Tannenbaum | 5,734,838 A | 3/1998 | Robinson |
| 5,530,232 A | 6/1996 | Taylor | 5,736,728 A | 4/1998 | Matsubara |
| 5,530,235 A | 6/1996 | Stefik et al. | 5,737,421 A | 4/1998 | Audebert |
| 5,532,689 A | 7/1996 | Bueno | 5,740,549 A | 4/1998 | Reilly et al. |
| 5,537,314 A | 7/1996 | Kanter | 5,742,775 A | 4/1998 | King |
| 5,541,583 A | 7/1996 | Mandelbaum | 5,745,049 A | 4/1998 | Akiyama et al. |
| 5,544,086 A | 8/1996 | Davis et al. | 5,745,555 A | 4/1998 | Mark |
| 5,544,246 A | 8/1996 | Mandelbaum et al. | 5,745,706 A | 4/1998 | Wolfberg et al. |
| 5,553,120 A | 9/1996 | Katz | 5,749,075 A | 5/1998 | Toader et al. |
| 5,577,109 A | 11/1996 | Stimson et al. | 5,760,381 A | 6/1998 | Stich et al. |
| 5,578,808 A | 11/1996 | Taylor | 5,765,138 A | 6/1998 | Aycock et al. |
| 5,581,064 A | 12/1996 | Riley et al. | 5,765,141 A | 6/1998 | Spector |
| 5,583,933 A | 12/1996 | Mark | 5,770,843 A | 6/1998 | Rose et al. |
| 5,585,787 A | 12/1996 | Wallerstein | 5,770,849 A | 6/1998 | Novis et al. |
| 5,590,038 A | 12/1996 | Pitroda | 5,774,870 A | 6/1998 | Storey |
| 5,592,560 A | 1/1997 | Deaton et al. | 5,774,882 A | 6/1998 | Keen |
| 5,604,542 A | 2/1997 | Dedrick | 5,777,305 A | 7/1998 | Smith |
| 5,608,785 A | 3/1997 | Kasday | 5,777,306 A | 7/1998 | Masuda |
| 5,612,868 A | 3/1997 | Off | 5,777,903 A | 7/1998 | Piosenka et al. |
| 5,617,474 A | 4/1997 | Ditzig et al. | 5,778,067 A * | 7/1998 | Jones et al. .................. 705/65 |
| 5,619,558 A | 4/1997 | Jheeta | 5,787,156 A | 7/1998 | Katz |
| 5,621,787 A | 4/1997 | McKoy et al. | 5,787,403 A | 7/1998 | Randle |
| 5,621,812 A | 4/1997 | Deaton et al. | 5,787,404 A | 7/1998 | Fernandez-Holman |
| 5,637,845 A | 6/1997 | Kolls | 5,789,732 A | 8/1998 | McMahon et al. |
| 5,638,457 A | 6/1997 | Deaton et al. | 5,789,733 A | 8/1998 | Jachimowicz et al. |
| 5,642,279 A | 6/1997 | Stone | 5,790,636 A | 8/1998 | Marshall |
| 5,642,485 A | 6/1997 | Deaton et al. | 5,794,207 A | 8/1998 | Walker et al. |
| 5,644,723 A | 7/1997 | Deaton et al. | 5,796,827 A | 8/1998 | Coppersmith et al. |
| 5,644,727 A | 7/1997 | Atkins | 5,798,950 A | 8/1998 | Fitzgerald |
| 5,649,114 A | 7/1997 | Deaton et al. | 5,799,087 A | 8/1998 | Rosen |
| 5,649,117 A | 7/1997 | Landry | 5,802,176 A | 9/1998 | Audebert |
| 5,649,118 A | 7/1997 | Carlisle et al. | 5,805,719 A | 9/1998 | Pare et al. |
| 5,652,786 A | 7/1997 | Rogers | 5,806,042 A | 9/1998 | Kelly et al. |
| 5,653,914 A | 8/1997 | Holmes et al. | 5,806,044 A | 9/1998 | Powell |
| 5,659,469 A | 8/1997 | Deaton et al. | 5,806,045 A | 9/1998 | Biorge |
| 5,659,741 A | 8/1997 | Eberhardt | 5,806,047 A | 9/1998 | Hackel et al. |
| 5,664,110 A | 9/1997 | Green et al. | 5,807,627 A | 9/1998 | Friend et al. |
| 5,664,157 A | 9/1997 | Takahira et al. | 5,809,478 A | 9/1998 | Greco |
| 5,665,953 A | 9/1997 | Mazzamuto | 5,814,796 A | 9/1998 | Benson et al. |
| 5,672,678 A | 9/1997 | Holmes et al. | 5,815,657 A | 9/1998 | Williams et al. |
| 5,675,607 A | 10/1997 | Alesio et al. | 5,815,658 A | 9/1998 | Kuriyama |
| 5,675,662 A | 10/1997 | Deaton et al. | 5,819,234 A | 10/1998 | Slavin et al. |
| 5,677,521 A | 10/1997 | Garrou | 5,819,237 A | 10/1998 | Garman |
| 5,677,955 A | 10/1997 | Doggett et al. | 5,825,871 A | 10/1998 | Mark |
| 5,680,459 A | 10/1997 | Hook et al. | 5,826,243 A | 10/1998 | Musmanno et al. |
| 5,684,291 A | 11/1997 | Taskett | 5,832,090 A | 11/1998 | Raspotnik |
| 5,687,322 A | 11/1997 | Deaton et al. | 5,832,457 A | 11/1998 | O'Brien et al. |
| 5,689,100 A | 11/1997 | Carrithers et al. | 5,832,488 A | 11/1998 | Eberhardt |
| 5,689,650 A | 11/1997 | McClelland et al. | 5,835,061 A | 11/1998 | Stewart |
| 5,692,132 A | 11/1997 | Hogan | 5,835,576 A | 11/1998 | Katz |
| 5,696,907 A | 12/1997 | Tom | 5,839,113 A | 11/1998 | Federau et al. |
| 5,698,837 A | 12/1997 | Furuta | 5,845,259 A | 12/1998 | West et al. |
| 5,699,528 A | 12/1997 | Hogan | 5,845,260 A | 12/1998 | Nakano et al. |
| 5,703,344 A | 12/1997 | Bezy | 5,852,811 A | 12/1998 | Atkins |
| 5,704,044 A | 12/1997 | Tarter et al. | 5,852,812 A | 12/1998 | Reeder |
| 5,704,046 A | 12/1997 | Hogan | 5,857,079 A | 1/1999 | Claus |
| 5,705,798 A | 1/1998 | Tarbox | 5,857,175 A | 1/1999 | Day |
| 5,708,422 A | 1/1998 | Blonder et al. | 5,857,709 A | 1/1999 | Chock |
| 5,710,458 A | 1/1998 | Iwasaki | 5,859,419 A | 1/1999 | Wynn |
| 5,710,886 A | 1/1998 | Christensen | 5,864,609 A | 1/1999 | Cross et al. |
| 5,710,887 A | 1/1998 | Chelliah | 5,864,828 A | 1/1999 | Atkins |
| 5,710,889 A | 1/1998 | Clark et al. | 5,864,830 A | 1/1999 | Armetta |
| 5,715,298 A | 2/1998 | Rogers | RE36,116 E | 2/1999 | McCarthy |
| 5,715,399 A | 2/1998 | Bezos | 5,870,456 A | 2/1999 | Rogers |
| 5,717,925 A | 2/1998 | Harper et al. | 5,870,718 A | 2/1999 | Spector |
| 5,721,768 A | 2/1998 | Stimson | 5,870,721 A | 2/1999 | Norris |
| 5,721,781 A | 2/1998 | Deo et al. | 5,875,437 A | 2/1999 | Atkins |

| | | | | | | |
|---|---|---|---|---|---|---|
| 5,883,377 | A | 3/1999 | Chapin, Jr. | 6,029,139 A | 2/2000 | Cunningham et al. |
| 5,883,810 | A | 3/1999 | Franklin et al. | 6,029,144 A | 2/2000 | Barrett et al. |
| 5,884,271 | A | 3/1999 | Pitroda | 6,029,153 A | 2/2000 | Bauchner et al. |
| 5,884,278 | A | 3/1999 | Powell | 6,029,890 A | 2/2000 | Austin |
| 5,884,285 | A | 3/1999 | Atkins | 6,032,136 A | 2/2000 | Brake, Jr. et al. |
| 5,887,065 | A | 3/1999 | Audebert | 6,032,859 A | 3/2000 | Muehlberger et al. |
| 5,890,138 | A | 3/1999 | Godin et al. | 6,036,099 A | 3/2000 | Leighton |
| 5,890,140 | A | 3/1999 | Clark et al. | 6,038,292 A | 3/2000 | Thomas |
| H1794 | H | 4/1999 | Claus | 6,038,552 A | 3/2000 | Fleischl |
| 5,897,620 | A | 4/1999 | Walker et al. | 6,041,315 A | 3/2000 | Pollin |
| 5,897,621 | A * | 4/1999 | Boesch et al. ............... 705/26 | 6,044,360 A | 3/2000 | Picciallo |
| 5,901,303 | A | 5/1999 | Chew | 6,045,042 A | 4/2000 | Ohno |
| 5,905,246 | A | 5/1999 | Fajkowski | 6,047,067 A | 4/2000 | Rosen |
| 5,907,142 | A | 5/1999 | Kelsey | 6,047,268 A | 4/2000 | Bartoli et al. |
| 5,907,350 | A | 5/1999 | Nemirofsky | 6,048,271 A | 4/2000 | Barcelou |
| 5,911,135 | A | 6/1999 | Atkins | 6,049,463 A | 4/2000 | O'Malley et al. |
| 5,911,136 | A | 6/1999 | Atkins | 6,049,773 A | 4/2000 | McCormack et al. |
| 5,914,472 | A | 6/1999 | Foladare et al. | 6,049,782 A | 4/2000 | Gottesman et al. |
| 5,920,629 | A | 7/1999 | Rosen | 6,055,573 A | 4/2000 | Gardenswartz et al. |
| 5,920,844 | A | 7/1999 | Hotta et al. | 6,058,378 A | 5/2000 | Clark et al. |
| 5,920,847 | A | 7/1999 | Kolling et al. | 6,061,660 A | 5/2000 | Eggleston et al. |
| 5,923,734 | A | 7/1999 | Taskett | 6,064,985 A | 5/2000 | Anderson |
| 5,926,800 | A | 7/1999 | Baronowski | 6,065,675 A | 5/2000 | Teicher |
| 5,928,082 | A | 7/1999 | Clapper, Jr. | 6,068,183 A | 5/2000 | Freeman et al. |
| 5,930,217 | A | 7/1999 | Kayanuma | 6,070,067 A | 5/2000 | Nguyen et al. |
| 5,931,764 | A | 8/1999 | Freeman et al. | 6,070,147 A | 5/2000 | Harms et al. |
| 5,933,817 | A | 8/1999 | Hucal | 6,070,153 A | 5/2000 | Simpson |
| 5,937,068 | A | 8/1999 | Audebert | 6,076,068 A | 6/2000 | DeLapa et al. |
| 5,940,811 | A | 8/1999 | Norris | 6,076,072 A | 6/2000 | Libman |
| 5,946,669 | A | 8/1999 | Polk | 6,078,888 A | 6/2000 | Johnson, Jr. |
| 5,949,044 | A | 9/1999 | Walker et al. | 6,078,891 A | 6/2000 | Riordan et al. |
| 5,952,641 | A | 9/1999 | Korshun | 6,085,976 A | 7/2000 | Sehr |
| 5,953,423 | A | 9/1999 | Rosen | 6,089,284 A | 7/2000 | Kaehler et al. |
| 5,953,710 | A | 9/1999 | Fleming | 6,091,817 A | 7/2000 | Bertina et al. |
| 5,955,961 | A | 9/1999 | Wallerstein | 6,092,056 A | 7/2000 | Tull, Jr. et al. |
| 5,956,695 | A | 9/1999 | Carrithers et al. | 6,092,057 A | 7/2000 | Zimmerman et al. |
| 5,960,411 | A | 9/1999 | Hartman et al. | 6,095,412 A | 8/2000 | Bertina et al. |
| 5,963,648 | A | 10/1999 | Rosen | 6,095,416 A | 8/2000 | Grant et al. |
| 5,963,925 | A | 10/1999 | Kolling et al. | 6,098,053 A | 8/2000 | Slater |
| 5,970,478 | A | 10/1999 | Walker et al. | 6,105,006 A | 8/2000 | Davis et al. |
| 5,970,479 | A | 10/1999 | Shepherd | 6,105,007 A | 8/2000 | Norris |
| 5,970,480 | A | 10/1999 | Kalina | 6,105,011 A | 8/2000 | Morrison, Jr. |
| 5,974,399 | A | 10/1999 | Giuliani et al. | 6,105,865 A | 8/2000 | Hardesty |
| RE36,365 | E | 11/1999 | Levine et al. | 6,109,525 A | 8/2000 | Blomqvist et al. |
| 5,979,757 | A | 11/1999 | Tracy | 6,112,191 A | 8/2000 | Burke |
| 5,984,180 | A | 11/1999 | Albrecht | 6,115,458 A | 9/2000 | Taskett |
| 5,984,191 | A | 11/1999 | Chapin, Jr. | 6,119,097 A | 9/2000 | Ibarra |
| 5,987,434 | A | 11/1999 | Libman | 6,119,103 A | 9/2000 | Basch et al. |
| 5,988,509 | A | 11/1999 | Taskett | 6,119,107 A | 9/2000 | Polk |
| 5,991,413 | A | 11/1999 | Arditti et al. | 6,119,932 A | 9/2000 | Maloney et al. |
| 5,991,736 | A | 11/1999 | Ferguson et al. | 6,122,623 A | 9/2000 | Garman |
| 5,991,743 | A | 11/1999 | Irving et al. | 6,128,598 A | 10/2000 | Walker et al. |
| 5,991,748 | A | 11/1999 | Taskett | 6,128,599 A | 10/2000 | Walker et al. |
| 5,991,750 | A | 11/1999 | Watson | 6,129,274 A | 10/2000 | Suzuki |
| 5,999,596 | A | 12/1999 | Walker et al. | 6,129,572 A | 10/2000 | Feldman et al. |
| 6,000,608 | A | 12/1999 | Dorf | 6,134,309 A | 10/2000 | Carson |
| 6,000,832 | A | 12/1999 | Franklin et al. | 6,134,536 A | 10/2000 | Shepherd |
| 6,002,383 | A | 12/1999 | Shimada | 6,138,911 A | 10/2000 | Fredregill et al. |
| 6,003,762 | A | 12/1999 | Hayashida | 6,138,917 A | 10/2000 | Chapin, Jr. |
| 6,004,681 | A | 12/1999 | Epstein et al. | 6,141,666 A | 10/2000 | Tobin |
| 6,006,205 | A | 12/1999 | Loeb et al. | 6,144,848 A | 11/2000 | Walsh et al. |
| 6,006,988 | A | 12/1999 | Behrmann et al. | 6,145,741 A | 11/2000 | Wisdom et al. |
| 6,009,415 | A | 12/1999 | Shurling et al. | 6,148,293 A | 11/2000 | King |
| 6,014,636 | A | 1/2000 | Reeder | 6,148,297 A | 11/2000 | Swor et al. |
| 6,014,638 | A | 1/2000 | Burge et al. | 6,161,096 A | 12/2000 | Bell |
| 6,014,645 | A | 1/2000 | Cunningham | 6,163,770 A | 12/2000 | Gamble et al. |
| 6,014,749 | A | 1/2000 | Gloor et al. | 6,164,533 A | 12/2000 | Barton |
| 6,016,482 | A | 1/2000 | Molinari et al. | 6,167,385 A | 12/2000 | Hartley-Urquhart |
| 6,016,954 | A | 1/2000 | Abe | 6,169,975 B1 | 1/2001 | White et al. |
| 6,018,718 | A | 1/2000 | Walker et al. | 6,173,267 B1 | 1/2001 | Cairns |
| 6,019,284 | A | 2/2000 | Freeman et al. | 6,182,048 B1 | 1/2001 | Osborn et al. |
| 6,021,189 | A | 2/2000 | Vu | 6,182,059 B1 | 1/2001 | Angotti et al. |
| 6,026,370 | A | 2/2000 | Jermyn | 6,182,894 B1 | 2/2001 | Hackett et al. |

| | | | | | | |
|---|---|---|---|---|---|---|
| 6,186,793 B1 | 2/2001 | Brubaker | | 6,484,148 B1 | 11/2002 | Boyd |
| 6,189,787 B1 | 2/2001 | Dorf | | 6,484,428 B1 | 11/2002 | Greenwald et al. |
| 6,192,113 B1 | 2/2001 | Lorsch | | D466,929 S | 12/2002 | Haas |
| 6,195,644 B1 | 2/2001 | Bowie | | D467,271 S | 12/2002 | Haas |
| 6,202,053 B1 | 3/2001 | Christiansen et al. | | D467,272 S | 12/2002 | Haas |
| RE37,122 E | 4/2001 | Levine et al. | | 6,490,568 B1 | 12/2002 | Omara et al. |
| 6,213,392 B1 | 4/2001 | Zuppicich | | 6,498,861 B1 | 12/2002 | Hamid et al. |
| 6,222,914 B1 | 4/2001 | McMullin | | D468,789 S | 1/2003 | Arnold et al. |
| 6,223,143 B1 | 4/2001 | Weinstock et al. | | 6,505,095 B1 | 1/2003 | Kolls |
| 6,227,447 B1 | 5/2001 | Campisano | | 6,505,168 B1 | 1/2003 | Rothman et al. |
| 6,243,688 B1 | 6/2001 | Kalina | | 6,505,780 B1 | 1/2003 | Yassin et al. |
| 6,260,758 B1 | 7/2001 | Blumberg | | 6,513,019 B2 | 1/2003 | Lewis |
| 6,263,316 B1 | 7/2001 | Khan et al. | | 6,529,880 B1 | 3/2003 | McKeen et al. |
| 6,265,977 B1 | 7/2001 | Vega et al. | | 6,553,113 B1 | 4/2003 | Dhir et al. |
| 6,267,292 B1 | 7/2001 | Walker et al. | | 6,557,039 B1 | 4/2003 | Leong et al. |
| 6,278,981 B1 | 8/2001 | Dembo et al. | | D474,235 S | 5/2003 | Haas |
| 6,278,996 B1 | 8/2001 | Richardson et al. | | 6,557,750 B1 | 5/2003 | Druse et al. |
| 6,289,322 B1 | 9/2001 | Kitchen et al. | | 6,557,766 B1 | 5/2003 | Leighton |
| 6,292,786 B1 | 9/2001 | Deaton et al. | | 6,560,578 B2 | 5/2003 | Eldering |
| 6,295,344 B1 | 9/2001 | Marshall | | 6,560,581 B1 | 5/2003 | Fox et al. |
| 6,295,522 B1 | 9/2001 | Boesch | | 6,561,657 B1 | 5/2003 | Schofield |
| 6,298,336 B1 | 10/2001 | Davis et al. | | 6,567,786 B1 | 5/2003 | Bibelnieks et al. |
| 6,308,268 B1 | 10/2001 | Audebert | | 6,567,791 B2 | 5/2003 | Lent et al. |
| 6,308,887 B1 | 10/2001 | Korman et al. | | 6,567,821 B1 | 5/2003 | Polk |
| 6,315,193 B1 | 11/2001 | Hogan | | 6,574,603 B1 | 6/2003 | Dickson et al. |
| 6,315,195 B1 | 11/2001 | Ramachandran | | 6,581,839 B1 | 6/2003 | Lasch et al. |
| 6,324,524 B1 | 11/2001 | Lent et al. | | D476,681 S | 7/2003 | Al Amri |
| 6,324,526 B1 | 11/2001 | Dagostino | | D476,683 S | 7/2003 | Kilburn |
| 6,327,573 B1 | 12/2001 | Walker et al. | | D477,359 S | 7/2003 | Haas |
| 6,327,575 B1 | 12/2001 | Katz | | 6,592,044 B1 | 7/2003 | Wong et al. |
| 6,330,543 B1 | 12/2001 | Kepecs | | 6,601,040 B1 * | 7/2003 | Kolls .......................... 705/14 |
| 6,330,546 B1 | 12/2001 | Gopinathan et al. | | 6,601,761 B1 | 8/2003 | Katis |
| 6,336,099 B1 | 1/2002 | Barnett et al. | | 6,607,127 B2 | 8/2003 | Wong |
| 6,338,048 B1 * | 1/2002 | Mori .......................... 705/41 | | 6,609,111 B1 | 8/2003 | Bell |
| 6,341,724 B2 | 1/2002 | Campisano | | 6,609,113 B1 | 8/2003 | O'Leary et al. |
| 6,343,743 B1 | 2/2002 | Lamla | | 6,609,654 B1 | 8/2003 | Anderson et al. |
| 6,345,261 B1 | 2/2002 | Feidelson | | 6,609,658 B1 | 8/2003 | Sehr |
| 6,345,766 B1 | 2/2002 | Taskett et al. | | 6,687,222 B1 | 8/2003 | Mittal et al. |
| 6,349,290 B1 | 2/2002 | Horowitz et al. | | RE38,255 E | 9/2003 | Levine et al. |
| 6,349,291 B1 | 2/2002 | Varma | | 6,615,189 B1 | 9/2003 | Phillips et al. |
| 6,349,972 B1 | 2/2002 | Geiger et al. | | 6,615,190 B1 | 9/2003 | Slater |
| 6,360,954 B1 | 3/2002 | Barnardo | | 6,625,582 B2 | 9/2003 | Richman et al. |
| 6,366,220 B1 | 4/2002 | Elliott | | 6,631,849 B2 | 10/2003 | Blossom |
| 6,366,967 B1 | 4/2002 | Wagner | | 6,641,049 B2 | 11/2003 | Luu |
| 6,373,969 B1 | 4/2002 | Adler | | 6,641,050 B2 | 11/2003 | Kelley et al. |
| 6,374,230 B1 | 4/2002 | Walker et al. | | 6,647,374 B2 | 11/2003 | Kansal |
| 6,377,669 B1 | 4/2002 | Walker et al. | | 6,671,673 B1 | 12/2003 | Baseman et al. |
| 6,385,591 B1 | 5/2002 | Mankoff | | D485,573 S | 1/2004 | Li |
| 6,385,594 B1 | 5/2002 | Lebda et al. | | 6,675,127 B2 | 1/2004 | LaBlanc et al. |
| 6,386,444 B1 | 5/2002 | Sullivan | | 6,675,149 B1 | 1/2004 | Ruffin et al. |
| 6,397,202 B1 | 5/2002 | Higgins et al. | | 6,693,544 B1 | 2/2004 | Hebbecker |
| 6,402,039 B1 | 6/2002 | Freeman et al. | | 6,727,802 B2 | 4/2004 | Kelly et al. |
| 6,405,181 B2 | 6/2002 | Lent et al. | | 6,732,919 B2 | 5/2004 | Macklin et al. |
| 6,405,182 B1 | 6/2002 | Cuervo | | D490,840 S | 6/2004 | Arakaki et al. |
| 6,409,593 B1 | 6/2002 | Petrecca | | D491,186 S | 6/2004 | Arakaki et al. |
| 6,411,947 B1 | 6/2002 | Rice et al. | | D491,953 S | 6/2004 | Arakaki et al. |
| 6,422,459 B1 | 7/2002 | Kawan | | 6,742,704 B2 | 6/2004 | Fitzmaurice et al. |
| 6,422,462 B1 | 7/2002 | Cohen | | 6,745,938 B2 | 6/2004 | Sullivan |
| 6,424,029 B1 | 7/2002 | Giesler | | 6,757,660 B2 | 6/2004 | Canada et al. |
| 6,424,949 B1 | 7/2002 | Deaton et al. | | 6,757,710 B2 | 6/2004 | Reed |
| 6,429,927 B1 | 8/2002 | Borza | | D495,736 S | 9/2004 | Scharf |
| 6,434,259 B1 | 8/2002 | Hamid et al. | | D496,365 S | 9/2004 | Liu et al. |
| D462,477 S | 9/2002 | Osborne | | 6,793,131 B2 | 9/2004 | Hogan |
| 6,446,210 B1 | 9/2002 | Borza | | 6,793,135 B1 | 9/2004 | Ryoo |
| 6,450,407 B1 | 9/2002 | Freeman et al. | | 6,802,008 B1 | 10/2004 | Ikefuji et al. |
| 6,454,647 B1 | 9/2002 | Woodbury, Jr. | | 6,805,287 B2 | 10/2004 | Bishop |
| 6,456,981 B1 | 9/2002 | Dejaeger et al. | | 6,805,288 B2 | 10/2004 | Routhenstein et al. |
| 6,463,039 B1 | 10/2002 | Ricci et al. | | D498,236 S | 11/2004 | Liu et al. |
| 6,467,684 B2 | 10/2002 | Fite et al. | | 6,856,973 B1 | 2/2005 | Bott |
| 6,473,500 B1 | 10/2002 | Risafi et al. | | 6,865,547 B1 | 3/2005 | Brake, Jr. et al. |
| 6,481,125 B1 | 11/2002 | Pokrasoff | | 6,868,426 B1 | 3/2005 | Mankoff |
| 6,484,144 B2 | 11/2002 | Martin et al. | | 6,876,971 B1 | 4/2005 | Burke |
| 6,484,146 B2 | 11/2002 | Day et al. | | D505,450 S | 5/2005 | Lauer et al. |

| | | |
|---|---|---|
| 6,895,383 B2 | 5/2005 | Heinrich |
| 6,895,386 B1 | 5/2005 | Bachman et al. |
| 6,901,372 B1 | 5/2005 | Helzerman |
| 6,912,502 B1 | 6/2005 | Buddle et al. |
| 6,942,569 B2 | 9/2005 | Petrecca |
| 6,945,453 B1 | 9/2005 | Schwarz Jr. |
| 6,961,710 B1 | 11/2005 | Yanagisawa et al. |
| 6,970,830 B1 | 11/2005 | Samra et al. |
| 6,978,369 B2 | 12/2005 | Wheeler et al. |
| 6,999,938 B1 | 2/2006 | Libman |
| 6,999,943 B1 | 2/2006 | Johnson et al. |
| 7,006,992 B1 | 2/2006 | Packwood |
| 7,014,110 B2 | 3/2006 | Minowa et al. |
| 7,025,256 B1 | 4/2006 | Drummond et al. |
| 7,039,600 B1 | 5/2006 | Meek et al. |
| 7,051,925 B2 | 5/2006 | Schwarz, Jr. |
| 7,051,929 B2 | 5/2006 | Li |
| 7,072,864 B2 | 7/2006 | Brake, Jr. et al. |
| 7,072,909 B2 | 7/2006 | Polk |
| 7,076,465 B1 | 7/2006 | Blagg et al. |
| 7,089,202 B1 | 8/2006 | McNamar et al. |
| 7,089,503 B1 | 8/2006 | Bloomquist et al. |
| 7,092,905 B2 | 8/2006 | Behrenbrinker et al. |
| 7,092,916 B2 | 8/2006 | Diveley |
| 7,104,443 B1 | 9/2006 | Paul et al. |
| 7,107,249 B2 | 9/2006 | Dively |
| 7,113,914 B1 | 9/2006 | Spielmann et al. |
| D533,220 S | 12/2006 | Graves et al. |
| 7,163,153 B2 | 1/2007 | Blossom |
| 7,165,049 B2 | 1/2007 | Slater |
| D538,349 S | 3/2007 | Hollands |
| 7,191,952 B2 | 3/2007 | Blossom |
| 7,195,154 B2 | 3/2007 | Routhenstein |
| 7,225,155 B1 | 5/2007 | Polk |
| 7,228,155 B2 | 6/2007 | Saunders |
| 7,243,839 B2 | 7/2007 | Beck et al. |
| 7,249,092 B2 | 7/2007 | Dunn et al. |
| 7,249,112 B2 | 7/2007 | Berardi et al. |
| 7,216,091 B1 | 8/2007 | Blandina et al. |
| 7,252,223 B2 | 8/2007 | Schofield |
| 7,263,507 B1 | 8/2007 | Brake, Jr. |
| D551,705 S | 9/2007 | Mershon |
| 7,266,524 B1 | 9/2007 | Butcher, III |
| 7,295,999 B1 | 11/2007 | Simon et al. |
| 7,306,141 B1 | 12/2007 | Schwarz, Jr. |
| 7,311,244 B1 | 12/2007 | Schwarz, Jr. |
| 7,312,707 B1 | 12/2007 | Bishop et al. |
| 7,315,843 B2 | 1/2008 | Diveley et al. |
| 7,346,567 B2 | 3/2008 | Weeks |
| 7,349,866 B2 | 3/2008 | Schwarz, Jr. |
| 7,357,331 B2 | 4/2008 | Blossom |
| 7,392,221 B2 | 6/2008 | Nabe |
| 7,392,222 B1 | 6/2008 | Hamilton et al. |
| 7,392,224 B1 | 6/2008 | Bauer et al. |
| D528,977 S | 12/2008 | Field et al. |
| D582,476 S | 12/2008 | Field et al. |
| 6,188,309 B1 | 2/2009 | Levine |
| 7,493,288 B2 | 2/2009 | Biship et al. |
| 7,506,806 B2 | 3/2009 | Bonalle et al. |
| 7,591,416 B2 | 9/2009 | Blossom |
| D602,522 S | 10/2009 | Field et al. |
| 2001/0002487 A1 | 5/2001 | Grawrock et al. |
| 2001/0011227 A1 | 8/2001 | Ashery et al. |
| 2001/0011243 A1 | 8/2001 | Dembo et al. |
| 2001/0014868 A1 | 8/2001 | Herz et al. |
| 2001/0027389 A1 | 10/2001 | Beverina et al. |
| 2001/0027441 A1 | 10/2001 | Wankmueller |
| 2001/0032312 A1 | 10/2001 | Runje et al. |
| 2001/0034647 A1 | 10/2001 | Marks et al. |
| 2001/0034663 A1 | 10/2001 | Teveler et al. |
| 2001/0034682 A1 | 10/2001 | Knight et al. |
| 2001/0037315 A1 | 11/2001 | Saliba et al. |
| 2001/0038033 A1 | 11/2001 | Habib |
| 2001/0044293 A1 | 11/2001 | Morgan |
| 2001/0047332 A1 | 11/2001 | Gonen-Friedman |
| 2001/0047342 A1 | 11/2001 | Cuervo |
| 2001/0051917 A1 | 12/2001 | Bissonette et al. |
| 2001/0054003 A1 | 12/2001 | Chien et al. |
| 2001/0056398 A1 | 12/2001 | Scheirer |
| 2002/0007313 A1 | 1/2002 | Mai et al. |
| 2002/0019793 A1 | 2/2002 | Frattalone |
| 2002/0019803 A1 | 2/2002 | Muller |
| 2002/0026416 A1 | 2/2002 | Provinse |
| 2002/0026418 A1 | 2/2002 | Koppel et al. |
| 2002/0032609 A1 | 3/2002 | Wilkman |
| 2002/0046089 A1 | 4/2002 | Zorn |
| 2002/0046255 A1 | 4/2002 | Moore et al. |
| 2002/0059139 A1 | 5/2002 | Evans |
| 2002/0062235 A1 | 5/2002 | Wahlbin et al. |
| 2002/0065712 A1 | 5/2002 | Kawan et al. |
| 2002/0065720 A1 | 5/2002 | Carswell et al. |
| 2002/0077964 A1 | 6/2002 | Brody et al. |
| 2002/0077978 A1 | 6/2002 | O'Leary et al. |
| 2002/0082990 A1 | 6/2002 | Jones |
| 2002/0091572 A1 | 7/2002 | Anderson et al. |
| 2002/0091631 A1 | 7/2002 | Usui |
| 2002/0095365 A1 | 7/2002 | Slavin et al. |
| 2002/0099586 A1 | 7/2002 | Bladen et al. |
| 2002/0103852 A1 | 8/2002 | Pushka |
| 2002/0104878 A1 | 8/2002 | Seifert et al. |
| 2002/0111916 A1 | 8/2002 | Coronna et al. |
| 2002/0116271 A1 | 8/2002 | Mankoff |
| 2002/0116330 A1 | 8/2002 | Hed et al. |
| 2002/0117541 A1 | 8/2002 | Biggar et al. |
| 2002/0120627 A1 | 8/2002 | Mankoff |
| 2002/0120642 A1 | 8/2002 | Fetherston |
| 2002/0129221 A1 | 9/2002 | Borgin et al. |
| 2002/0133461 A1 | 9/2002 | Ramachandran |
| 2002/0138418 A1 | 9/2002 | Zarin et al. |
| 2002/0143703 A1 | 10/2002 | Razvan et al. |
| 2002/0145039 A1 | 10/2002 | Carroll |
| 2002/0147662 A1 | 10/2002 | Anderson |
| 2002/0156723 A1 | 10/2002 | Lilly et al. |
| 2002/0165771 A1 | 11/2002 | Walker et al. |
| 2002/0165820 A1 | 11/2002 | Anvekar et al. |
| 2002/0169719 A1 | 11/2002 | Dively et al. |
| 2002/0174016 A1 | 11/2002 | Cuervo |
| 2002/0174018 A1 | 11/2002 | Bunger et al. |
| 2002/0178025 A1 | 11/2002 | Hansen et al. |
| 2002/0194081 A1 | 12/2002 | Perkowski |
| 2003/0004828 A1 | 1/2003 | Epstein |
| 2003/0018613 A1 | 1/2003 | Oytac |
| 2003/0023549 A1 | 1/2003 | Armes et al. |
| 2003/0028483 A1 | 2/2003 | Sanders et al. |
| 2003/0028518 A1 | 2/2003 | Mankoff |
| 2003/0033211 A1 | 2/2003 | Haines et al. |
| 2003/0033246 A1 | 2/2003 | Slater |
| 2003/0034388 A1 | 2/2003 | Routhenstein et al. |
| 2003/0040927 A1 | 2/2003 | Sato et al. |
| 2003/0040959 A1 | 2/2003 | Fei et al. |
| 2003/0046249 A1 | 3/2003 | Wu |
| 2003/0053609 A1 | 3/2003 | Risafi et al. |
| 2003/0061157 A1 | 3/2003 | Hirka |
| 2003/0061168 A1 | 3/2003 | Routhenstein |
| 2003/0074167 A1 | 4/2003 | Browne et al. |
| 2003/0074290 A1 | 4/2003 | Clore |
| 2003/0085286 A1 | 5/2003 | Kelley et al. |
| 2003/0101119 A1 | 5/2003 | Parsons et al. |
| 2003/0105672 A1 | 6/2003 | Epstein et al. |
| 2003/0110111 A1 | 6/2003 | Nalebuff et al. |
| 2003/0135462 A1 | 7/2003 | Brake, Jr. et al. |
| 2003/0140004 A1 | 7/2003 | O'Leary et al. |
| 2003/0144935 A1 | 7/2003 | Sobek |
| 2003/0154125 A1 | 8/2003 | Mittal et al. |
| 2003/0163403 A1 | 8/2003 | Chen et al. |
| 2003/0163416 A1 | 8/2003 | Kitajima |

| | | |
|---|---|---|
| 2003/0167218 A1 | 9/2003 | Field et al. |
| 2003/0172040 A1 | 9/2003 | Kemper et al. |
| 2003/0182246 A1 | 9/2003 | Johnson et al. |
| 2003/0187787 A1 | 10/2003 | Freund |
| 2003/0195808 A1 | 10/2003 | Brown et al. |
| 2003/0200143 A9 | 10/2003 | Walker et al. |
| 2003/0200180 A1 | 10/2003 | Phelan et al. |
| 2003/0204421 A1 | 10/2003 | Houle et al. |
| 2003/0213843 A1 | 11/2003 | Jackson |
| 2003/0216965 A1 | 11/2003 | Libman |
| 2003/0217005 A1 | 11/2003 | Drummond et al. |
| 2003/0217329 A1 | 11/2003 | Good |
| 2003/0218066 A1 | 11/2003 | Fernandes et al. |
| 2003/0229525 A1 | 12/2003 | Callahan et al. |
| 2004/0024672 A1 | 2/2004 | Brake, Jr. et al. |
| 2004/0029569 A1 | 2/2004 | Khan et al. |
| 2004/0030626 A1 | 2/2004 | Libman |
| 2004/0039588 A1 | 2/2004 | Libman |
| 2004/0049451 A1 | 3/2004 | Berardi |
| 2004/0049452 A1 | 3/2004 | Blagg |
| 2004/0059952 A1 | 3/2004 | Newport et al. |
| 2004/0064402 A1 | 4/2004 | Dreyer et al. |
| 2004/0078328 A1 | 4/2004 | Talbert et al. |
| 2004/0093296 A1 | 5/2004 | Phelan et al. |
| 2004/0093303 A1 | 5/2004 | Picciallo |
| 2004/0094624 A1 | 5/2004 | Fernandes et al. |
| 2004/0098351 A1 | 5/2004 | Duke |
| 2004/0103431 A1 | 5/2004 | Davenport et al. |
| 2004/0118914 A1 | 6/2004 | Smith et al. |
| 2004/0128186 A1 | 7/2004 | Breslin et al. |
| 2004/0128195 A1 | 7/2004 | Sorem |
| 2004/0133787 A1 | 7/2004 | Doughty et al. |
| 2004/0149544 A1 | 8/2004 | Dal Ferro |
| 2004/0155101 A1 | 8/2004 | Royer et al. |
| 2004/0159700 A1 | 8/2004 | Khan et al. |
| 2004/0193539 A1 | 9/2004 | Sullivan |
| 2004/0215507 A1 | 10/2004 | Levitt et al. |
| 2004/0232223 A1 | 11/2004 | Beenau et al. |
| 2004/0236688 A1 | 11/2004 | Bozeman |
| 2004/0239481 A1 | 12/2004 | Beenau |
| 2004/0242308 A1 | 12/2004 | Gray |
| 2004/0243498 A1 | 12/2004 | Duke |
| 2004/0252012 A1 | 12/2004 | Beenau et al. |
| 2005/0021353 A1 | 1/2005 | Aviles et al. |
| 2005/0021400 A1 | 1/2005 | Postrel |
| 2005/0021457 A1 | 1/2005 | Johnson et al. |
| 2005/0027649 A1 | 2/2005 | Cech |
| 2005/0033619 A1 | 2/2005 | Barnes et al. |
| 2005/0035192 A1 | 2/2005 | Bonalle et al. |
| 2005/0035847 A1 | 2/2005 | Bonalle et al. |
| 2005/0049950 A1 | 3/2005 | Johnson |
| 2005/0065877 A1 | 3/2005 | Cleary et al. |
| 2005/0071230 A1 | 3/2005 | Mankoff |
| 2005/0075932 A1 | 4/2005 | Mankoff |
| 2005/0077349 A1 | 4/2005 | Bonalle et al. |
| 2005/0077350 A1 | 4/2005 | Courtion et al. |
| 2005/0086160 A1 | 4/2005 | Wong et al. |
| 2005/0086167 A1 | 4/2005 | Brake |
| 2005/0091138 A1 | 4/2005 | Awatsu |
| 2005/0091492 A1 | 4/2005 | Benson et al. |
| 2005/0102228 A1 | 5/2005 | Srinivasan et al. |
| 2005/0108152 A1 | 5/2005 | Tsoa-Lee et al. |
| 2005/0114883 A1 | 5/2005 | Nagai et al. |
| 2005/0116024 A1 | 6/2005 | Beenau et al. |
| 2005/0119979 A1 | 6/2005 | Murashita |
| 2005/0167488 A1 | 8/2005 | Higgins et al. |
| 2005/0171898 A1 | 8/2005 | Bishop et al. |
| 2005/0179251 A1 | 8/2005 | Wagoner et al. |
| 2005/0189427 A1 | 9/2005 | Brown et al. |
| 2005/0199705 A1 | 9/2005 | Beck et al. |
| 2005/0206499 A1 | 9/2005 | Fisher |
| 2005/0216888 A1 | 9/2005 | Drummond et al. |
| 2005/0234771 A1 | 10/2005 | Register et al. |
| 2005/0269396 A1 | 12/2005 | Schofield |
| 2006/0026092 A1 | 2/2006 | Klein et al. |
| 2006/0036553 A1 | 2/2006 | Gupta |
| 2006/0039733 A1 | 2/2006 | Meyerhofer |
| 2006/0041540 A1 | 2/2006 | Shannon et al. |
| 2006/0047573 A1 | 3/2006 | Mitchell et al. |
| 2006/0047589 A1 | 3/2006 | Grau |
| 2006/0074794 A1 | 4/2006 | Nespola, Jr. |
| 2006/0085334 A1 | 4/2006 | Murphy |
| 2006/0106696 A1 | 5/2006 | Carlson |
| 2006/0116903 A1 | 6/2006 | Becerra |
| 2006/0122918 A1 | 6/2006 | Graboske et al. |
| 2006/0131869 A1 | 6/2006 | Brignull |
| 2006/0224480 A1 | 10/2006 | Bent et al. |
| 2006/0242057 A1 | 10/2006 | Velarde |
| 2006/0249574 A1 | 11/2006 | Brown et al. |
| 2006/0251478 A1 | 11/2006 | Desmeules |
| 2006/0259364 A1 | 11/2006 | Strock et al. |
| 2006/0261927 A1 | 11/2006 | Kelly et al. |
| 2007/0034700 A1 | 2/2007 | Poidomani et al. |
| 2007/0078719 A1 | 4/2007 | Schmitt et al. |
| 2007/0136211 A1 | 6/2007 | Brown et al. |
| 2007/0156530 A1 | 7/2007 | Schmitt et al. |
| 2007/0203825 A1 | 8/2007 | Hanifin et al. |
| 2007/0208671 A1 | 9/2007 | Brown et al. |
| 2007/0215688 A1 | 9/2007 | Routhenstein |
| 2007/0265924 A1 | 11/2007 | Schwarz |
| 2008/0010202 A1 | 1/2008 | Schwarz |
| 2008/0177659 A1 | 7/2008 | Lacey et al. |
| 2008/0277465 A1 | 11/2008 | Pletz |
| 2009/0043651 A1 | 2/2009 | Schwarz |
| 2009/0150370 A1 | 6/2009 | Christensen et al. |
| 2009/0261161 A1 | 10/2009 | Blossom |
| 2009/0265275 A1 | 10/2009 | Everhart |
| 2009/0271853 A1 | 10/2009 | Everhart |

FOREIGN PATENT DOCUMENTS

| | | |
|---|---|---|
| EP | 0843292 A2 | 5/1998 |
| EP | 0855659 | 7/1998 |
| EP | 959440 | 11/1999 |
| GB | 2275654 A | 9/1994 |
| GB | 2376787 | 12/2002 |
| GB | 2377071 | 12/2002 |
| GB | 2377314 | 1/2003 |
| WO | WO 94/29112 | 12/1994 |
| WO | WO 97/41673 | 11/1997 |
| WO | WO 9810368 | 3/1998 |
| WO | WO 98/59307 | 12/1998 |
| WO | WO 99/05633 | 2/1999 |
| WO | WO 99-54841 | 10/1999 |
| WO | WO 01/18699 | 3/2001 |
| WO | WO 01/69347 | 9/2001 |
| WO | WO 01/69347 A2 | 9/2001 |
| WO | WO 01/69347 A3 | 9/2001 |
| WO | WO 0188659 | 11/2001 |
| WO | WO 2005/043277 A3 | 5/2005 |
| WO | WO 2005101975 | 11/2005 |
| WO | WO 2006060370 | 6/2006 |
| WO | WO 2006105092 | 10/2006 |
| WO | WO 2006116772 | 11/2006 |
| WO | WO 2008021381 | 2/2008 |
| WO | WO 2008021382 | 2/2008 |

OTHER PUBLICATIONS

"Associates First Capital Corporation", Hoover's Inc., The Industry Standard: The Newsmagazine of the Internet Economy, thestandard.net/companies/cpmpany-display, Apr. 6, 1999.

Jeffrey M. Lacker, "Stored Value Cards: Costly Private Substitutions for Government Currency", Economic Quarterly, 1996.

"The Evolution of a New Consumerism", Chain Store Age, vol. 73, pp. 8-9, Jun. 1997.

Lisa Fickenscher, "Amex prepaid offering is latest card for firms regarding employees", American Banker, vol. 161, No. 151, p. 11, Aug. 8, 1996.
"Welcome to Swiftgift", Swiftgift, www.swiftgiftcard.com, Dec. 8, 1998.
Lucy Lzarony, "Stuck for a gift? Give a prepaid credit card", www.bankrate.com, Dec. 21, 1998.
Antoinette Coulton, "Incentives field moving to card-based series 14", American Banker, Mar. 26, 1998.
Credit Card News, "A store card issuer looks for lift from electronic gift certificates", Feb. 1, 1995.
Business Travel News, "Maritz gets mastercard's stamp of approval", Aug. 19, 1996.
Debit Card News, vol. 2, Issue 2, "Boatman's floats stored value into the employee incentive waters", Jul. 16, 1996.
Mickey Meece, "Boatman's prepaid cards for worker-incentive firm", American Banker, Jul. 2, 1996.
Card News, vol. 6, No. 25, "D.C. Area Safeway stores look for increase in sales volume and revenue with cards", Dec. 1991.
Spurgin, "Sopininmon! or What's happening in the retail credit card environment", Credit World Journal, Apr. 1997.
AT&T Marketing, "Universal card free lifetime membership extended 3 months", www.att.com/press/0297/970217.csa.html, Dec. 4, 1990.
Chain Store Age Executive with Shopping Center Age, "More retailers turn to co-branding", Feb. 1, 1995.
Introducing SpendingMoney(TM), Armetta: Marketing & Design Product Concept Report, Oct. 9, 1996.
First USA Platinum Connect, First USA Bank, First USA Promotional Mailing, Oct. 1997.
Introducing the First USA Platinum Connect Card, First USA Promotional Mailing, Dec. 1997.
Here's the calling convenience you asked for: 1-800-call-AT&T . . . For All Calls, Appendix A: For Card Carriers.
Beth Piskora, Debit Cards Seen Poised for New Markets, American Banker, pp. 16, Mar. 7, 1995.
Nick Rosen, Cash Just Isn't Flexible Enough: Shops of the Future Will Only Take Cards, Daily Express: Technology Section, Feb. 10, 1995.
Phil Britt, Competing in Auto Lending, America's Community Banker, vol. 5, No. 11, pp. 33-37, Nov. 1, 1996.
Miriam Krenin Souccar, Smart Cards: 1st Union Smart Card Pilot Enlists a Second Army Base, American Banker.
First Union Issues Smart Cards to Fort Benning Recruits, CardFax.
Emerson Brown and Jim Baum, Purchasing Card Magic: Eli Lilly Finds Accounts Payable Flying High With Plastic, Corporate Cashflow.
International Search Report for Application No. PCT/US01/03587 filed on Feb. 9, 2000 and dated Apr. 27, 2001.
International Preliminary Examination Report for Application No. PCT/US01/03587 filed on Feb. 9, 2000 and dated Jul. 18, 2002.
Christine Dugas, Payroll May Ask: Paper or Plastic?, USA Today, 3B, Aug. 14, 2001.
5500 - FDIC General Counsel's Opinion No. 8 - Stored Value Cards, 61 Fed. Reg. 40490, http://www.fdic.gov/regulations/laws/rules/5500-500.html, Aug. 2, 1996.
Song, A Card That Asks for ID, TIme Magazine, Apr. 12, 2004, 1 page.
Claessens, et al., A Tangled World Wide Web of Security Issues, First Monday, retrieved from the internet at http://www.firstmonday.org/issues/issue7_3/claessens, retrieved from the internet on Oct. 6, 2006.
Hotchkiss, ATM's at the head of their class, Bank Marketing, vol. 29, No. 3, Mar. 1997, pp. 26-32.
Edwards, ATMs The Hot New Media Buy, ABA Banking Journal, Mar. 1999, pp. 58, 60.
American Express Incentive Services, Incentive, Sep. 1996, p. 126.
Neumann, An Enhanced Neural Network Technique for Software Risk Analysis, IEEE Transactions on Software Engineering, vol. 28, No. 9, Sep. 1, 2002, pp. 904-912.
Brehl, Banks issue cash-card pledge, The Toronto Star, Oct. 9, 1997, 1 page.
Block, Valerie, Blockbuster running test of a stored value card, The American Banker, Sep. 1, 1995.
CES/NaBANCO introduces stored value card technology blockbuster video is first merchant partner, Business Wire, Inc., Jan. 15, 1996.
CardFlash, Apr. 5, 2005.
Vandenengel, Cards on the Internet: Advertising on a $3 Bill, Industry Intelligence, Feb. 1, 1995, pp. 46-48.
Kutler, Cash Card Creator Looking Beyond Mondex, Feb. 9, 1995.
Bank, Cash, Check,Charge--What's Next?, Seattle Times, Mar. 6, 1995.
Morgan et al., Categorizing Risks for Risk Ranking, vol. 20, No. 1, Jun. 22, 2005, pp. 49-58.
Common electronic purse specifications, Business Requirements, Version 6.0, Dec. 1998.
Guidotti, Comparing Environmental risks: A Consultative Approach to Setting Priorities at the Community Level, Public Health Rev 1994, vol. 22, Jun. 16, 2005, pp. 321-337.
Consortium created to manage common electronic purse specification, Cardtech Securtech, Chicago, www.visa.com/av/news/PRinisc051199.vhtml, May 11, 1999.
Nora Wood, Corporate Spotlight, Incentive, Dec. 1997, 4 pages.
Mobasher et al., Creating Adaptive Web Sites Through Usage-Based Clustering of URLs, Knowledge and Data Engineering Exchange Workshop, Chicago, IL and Los Alamitos, CA, 1999, pp. 19-25.
Lamond, Credit Card Transactions Real World and Online, Paying by Credit Card-Real World and Online, http://www.virtualschool.edu/mon/ElectronicProperty/Idamond/credit, printed Jul. 8, 2005, 17 pages.
Definition of Store-Value Card, Wikipedia, retrieved from the internet at http://en.wikipedia.org/wiki/Stored-value_card, retrieved from the internet on Apr. 16, 2007.
E-Z Pass, Web page, http://www.ezpass.com-Disc_portNewYork.html, Nov. 12, 2001.
E-Z Pass, Web page, http: \ \www.ezpass.com-Disc_ny_annual.html, Nov. 12, 2001.
E-Z Pass, Web page, http: \ \www.ezpass.com-frameMain.html, Nov. 12, 2001.
E-Z Pass, Web page, http: \ \www.ezpass.com-whatis.html, Nov. 12, 2001.
Eight Keys to Making the Right Choice, Incentive, Dec. 1996, 9 pages.
D. O'Mahony, Electronic Payment System, 1997, Artech House, XP002137255, pp. 7-11.
Business Times, Electronic Purse Can Free You from ATM Drag, Business Times, www.btimes.co.za, printed Feb. 23, 2001, 1 page.
Electronic Purse, SCIA (Smart Card Industry Association), About Smart Cards, www.scia.org, printed Feb. 23, 2001, 1 page.
Sanchez-Klein, Electronic purse alliance planned, Computerworld Online News, Jul. 29, 1998, printed Feb. 23, 2001, 2 pages.
Electronic purse card to be launched tomorrow, New Straits Times, News Clippings, Sep. 18, 1999, printed Feb. 23, 2001, 3 pages.
Exclusively Yours From Maritz. . . The MasterCard Card Ultimate Incentive, Incentive, Oct. 1995, 3 pages.
Block, First Data Subsidiary Creates Payroll Card for the Bankless, LexisNexis Academic, Credit/Debit/ATM's, p. 10, Mar. 21, 1997.
First Data markets stored-value cards, Cards International, Jan. 30, 1996, p. 5.
Norris, First data unit develops blockbuster cash card, Omaha World Hearld Sunrise Edition, Business Section, Jan. 19, 1996, p. 16.
Frequently asked questions, ECARD, www.eregard.com, printed Sep. 23, 2001, 7 pages.
Machlis, Have it the smart way: Burger King program drives smart-card use, Computerworld, printed Feb. 23, 2001, 1 page.
Hoovers, General Mills, Inc. Corporate Profile relied upon to show the history of the company, http://cobrands.hoovers.com/global/cobrands/proquest/history.xhtrnl?COID=10639, Jul. 12, 2005, 2 pages.
Konrad, IBM Had a Bunch of Unusual Ideas in 2003, www.philly.com, printed Jan. 21, 2004, posted on Jan. 13, 2004, 2 pages.
Judy Quinn, Incentive Cards Explained, Incentive, Dec. 1995, 5 pages.

Vincent Alonzo, Incentive Marketing. . . Three If by Smart Card, Incentive Sep. 1995, p. 11.
Incentive gift Card: Another way to give the gift of choice!, Incentive, Aug. 1995, 2 pages.
Key Bank Holiday Offer, http://www.key.com/swiftgift/home.html, printed Apr. 5, 1999.
LexisNexis Academic, Debit Card Innovation, vol. XXXV, No. 5, p. 2, May 1997.
LexisNexis Academic, Debit Cards: Payroll Card Ups Fees, Future Banker, p. 18, Oct. 6, 1997.
LexisNexis Academic, NTS' TransPay Debit Card Helps Remote and Unbanked Employees Get Funds Quicker, Financial News, Mar. 18, 1997.
MailFrontier Survey Finds that Consumers Hold Financial Institutions Accountable for Online Identitiy Theft, www.mailfrontier.com, Palo Alto, CA, Nov. 2004.
Maritz, Incentive, Jun. 1996, p. 111.
Clark, Microsoft, Visa to Jointly Develop PC Electronic-Shopping Software, The Wall Street Journal, Nov. 9, 1994, WSJ B9.
Bogle, Mutual Funds at the Millennium: Fund Directors and Fund Myths, The Vanguard Group to the '40 Act Institute of PLI (Practicing Law Institute), New York, NY, May 15, 2000, 15 pages.
New 1-800-Call-ATT Campaign Promotes One Number For All Calls, At&T Marketing, News Release, www.att.com/press/0297/970217.csa.htm, Feb. 17, 1997, 2 pages.
Allen et al., Overview of Smart Cards and the Industry, Smart Cards: Seizing Strategic Business Opportunities, Chapter 1, p. 2-20, Irwin Professional Publishing, 1997.
Paper or Plastic? With these three incentives, The Choice is Yours, Incentive, Feb. 1996, 2 pages.
Proton world and Europay to co-operate in creation of new CEPS-compliant e-purse application, Press Release 1999, Waterloo, Belgium, Jun. 28, 1999, 2 pages.
Purse Application for Cross Border Use in Euro, Cordis, Pace 1st 1999-11531 Pace, www.cordis.lu, printed Feb. 23, 2001, 3 pages.
SK100 Smart Card Electronic Purse Balance Reader, SK100 Balance Reader, http://perso.wanadoo.fr, printed Feb. 23, 2001, 1 page.
Miller, Section E.2.1: Kerberos Authentication and Authorization System, Project Athena, Cambridge, MA, Dec. 21, 1987, 39 pages.
Smart Cards: Big Brother's Little Helpers, the Privacy Committee of New South Wales, No. 66, Aug. 1995.
Smart card for loyalty and e-purse applications eclipses capability of conventional mag-stripe cards, Press Release, www.1.sib.com, Apr. 21, 1997, printed Feb. 23, 2001, 3 pages.
SmartAxis: Load Cash on to your E-Purse Card, Supported Currencies and Schemes, www.smartaxis.co.uk, printed Feb. 23, 2001, 9 pages.
Key, Swift Gift 'Wows' Internet Shoppers, PR Newswire, www.key.com/swiftgift/home.html, Dec. 2, 1998, 1 page.
The Campus Card Conundrum, Card Technology, Journal ISSN: 1093-1279, p. 25+, Feb. 1998, pp. 1-8.
The Electronic Purse Reaches the Car Park, http: \ \ docs.vircom.net/mobility/parking, printed Feb. 23, 2001, 2 pages.
Stoughton, The Gift of Credit, www.washingtonpost.com/wp-srv/business, Dec. 14, 1998.
Nora Wood, The Power of the Card, Incentive, Jul. 1997, 6 pages.
Stuber, The electronic purse: An overview of recent development and issues, Bank of Canada, Technical Report No. 74, www.bankofcanada.ca, Jan. 1996, printed Feb. 23, 2001, 2 pages.
Understanding the benefits: Smartcity offers a number of important benefits to both the card issuers and their customers, http://www.icl.com/smartcards/benefits.htm, printed Feb. 27, 2001, 2 pages.
Langheinrich et al., Unintrusive Customization Techniques for Web Advertising, Computer Networks, vol. 31, 1999, pp. 1259-1272.
Visa Cash - Where can I get it?, www.visa-asia.com/pd/cash/where.html, Feb. 23, 2001.
Visa Cash, www.visa-asia.com/pd/cash/main.html, Feb. 23, 2001.
Visa International and SERMEPA Announce Plans For Cross Border Visa Cash Based on CEPS, www.visa.com/av/news/praaamisc111699.vhtml, Nov. 16, 1999.
Visa first to launch electronic purse load via GSM mobile phone, www.cellular.co.za, Johannesburg, ZA, printed Feb. 23, 2001, 4 pages.
Visa releases visa cash electronic purse specifications based on CEPS, www.visa.com/av/news/PRaamisc042099.vhtml, San Francisco, Apr. 20, 1999.
Hansell, Visa to unveil electronic purse cards, New York Times, printed Feb. 23, 2001, 2 pages.
Welcome to Card Express CardEx, CardEx website archived by web.archive on Oct. 31, 1996, http://web.archive.org/web/*/http://www.cardex.com, retrieve Oct. 18, 2003, 7 pages.
Welcome to Card Express, The CardEx Incentive Card, as disclosed in the CardEx web site archived by web.archive.org on Feb. 7, 1998, http://web.archive.org/web/*/http://www.cardex.com, retrieve Oct. 18, 2003, 8 pages.
Kenneth Hein, What's the Deal?, Incentive, Jul. 1998, 7 pages.
Machlis et al., Will smart cards replace ATMS?, Computerworld, printed Feb. 23, 2001, 3 pages.
A Store Card Issuer Looks for Lift from Electronic Gift Certificates, Credit Card News, Feb. 1, 1995, 2 pages.
Abstract to 2007 JPMorgan Chase Disaster Response Card National Strategy Plan Abstract, Jan. 2007.
Siegel, Joel G., et. al., Accounting Handbook (1995).
Fickenscher, Amex Prepaid Offering is Latest Card for Firms Regarding Employees, American Banker, vol. 161, No. 151, Aug. 8, 1996, pp. 1-2.
The State of Arkansas, Arkansas Code of 1987 Annotated (1987).
Associates First Capital Corporation, Hoover's Inc., The Industry Standard: The Newsmagazine of the Internet Economy, thestandard.net/companies/company-display, Apr. 6, 1999.
Anonymous, Association of Inventive Gift Certificate Suppliers, (2005).
E-LOAN, Auto Loan Rates, Sep. 30, 2008.
Plotnick, Jennifer, Bakersfield Calif Investors Explore Buying Rental Property; Apr. 11, 2004.
Meece, Boatman's Prepaid Cards for Worker-Incentive Firm, American Banker, Jul. 2, 1996, p. 12.
Boatmen's Floats Stored Value into the Employee Incentive Waters, Debit Card News, vol. 2, Issue 2, Jul. 16, 1996, 3 pages.
CardEx Incentives, www.cardex.com, Apr. 6, 1999.
Rosen, Cash Just Isn't Flexible Enough: Shops of the Future Will Only Take Cards, Daily Express, Technology Section, Feb. 10, 1995, 1 page.
Britt, Competing in Auto Lending, America's Community Banker, vol. 5, No. 11, Nov. 1, 1996, pp. 33-37.
Haddad, Charles, Et. Al., Congratulations, Grads -- You're Bankrupt; A Marketing Blitz Buries Kids in Plastic and Debt, May 21, 2001.
D.C. Area Safeway Stores Look for Increase in Sales Volume And Revenue with Cards, Card News, vol. 6, No. 25, Dec. 30, 1991, pp. 7-9.
Cardweb.Com, Daily Payment Card News, Apr. 5, 2005.
Sherer, Paul M., Deals & Deal Makers: Web Ventures Seek to Facilitate Business Credit, Private Equity, Nov. 1999.
Piskora, Debit Cards Seen Poised for New Markets, American Banker, Credit/Debit/ATMs, Mar. 7, 1995, p. 16.
Lennox, Graeme, Don't Be Tempted by the Urge to Splurge: Zero Rates Sound Great But You'll Pay Dearly in the End, Jul. 2001.
First USA Platinum Connect, First USA Bank, First USA Promotional Mailing, Oct. 1997, 6 pages.
First Union Issues Smart Cards to Fort Benning Recruits, CardFax, vol. 1999, No. 60, Mar. 26, 1999, 1 page.
Roberts, Leigh, Fnb And Nedcor Launch Into The New Era of Smart Card Banking; Nov. 15, 1998.
E-LOAN, Frequently Asked Questions, Sep. 30, 2008.
Ostroff, Jeff, Guide to Buying New Cars, Used Cars, Dealer Scams, Sep. 2008.
Here's the calling convenience you asked for: 1-800-call-ATT . . . For All Calls, AT&T, Appendix A: For Card Carriers, 1999, 7 pages.
Cheney, How Effective Were the Financial Saftey Nets in the Aftermath of Katrina, HurricaneKatrinaJan06, Jan. 2006.
Coulton, Incentives Field Moving to Card-Based Series 14, American Banker, Mar. 26, 1998, 3 pages.
Introducing SpendingMoney(TM), Annetta: Marketing & Design Product Concept Report, Oct. 9, 1996, 15 pages.
Introducing the First USA Platinum Connect Card, First USA Promotional Mailing, Dec. 1997, 2 pages.

Request Information for Electronic Benefit Transfer (EBT) Services Dept. Of Health and Human Services Aug. 2006_Final.
Alaska Housing Finance Corporation - Request for Information Banking Services, Mar. 2005, JPMC-ACS-00000143-231.
Kibble-Smith Statement to House, Apr. 5 2006.
Power, Denise, Loehmann's Compiles Shopper Data Via Credit Card, Jan. 7, 1998.
O'Conner, Maritz Gets MasterCard's Stamp of Approval, Business Travel News, Aug. 19, 1996, 2 pages.
Kilian-Kehr, Roger, Mobile Security with Smartcards Dissertation, Apr. 2002.
More Retailers Turn to Co-Branding, Chain Store Age Executive with Shopping Center Age, Feb. 1, 1995, 3 pages.
Lewis, David, Mortgage Lending Optimized, Issue 858, Apr. 2001.
Feldman, Judy, Pay By Check Over The Phone Or Net, vol. 28, Issue 10, Oct. 1999,.
Dugas, Payroll May Ask: Paper or Plastic?, USA Today, 3B, Aug. 14, 2001, 1 page.
Youll, James, Peer to Peer Transactions in Agent Mediated Electronic Commerce, Aug. 2001.
Wolf, Harold A., Personal Finance, (1981).
Brown et al., Purchasing Card Magic: Eli Tilly Finds Accounts Payable Flying High With Plastic, Corporate Cashflow, vol. 15, No. 12, Nov. 1994, 2 pages.
None, Smart Cards Forging Into Credit Card Market, Apr. 3, 1995.
Souccar, Smart Cards: 1st Union Smart Card Pilot Enlists a Second Army Base, American Banker, Digital Frontiers, vol. 164, No. 61, Mar. 31, 1999, 3 pages.
Spurgin, Sopininmon! or What's Happening in the Retail Credit Card Environment, Credit World Journal, vol. 85, No. 4, Mar. 1, 1997, pp. 20-23.
Lacker, Stored Value Cards: Costly Private Substitutions for Government Currency, Economic Quarterly, 1996, Economic Quarterly, v82, n3, p1(25), ISSN: 1069-7225, 17 pages.
Lazarony, Stuck for a gift? Give a prepaid credit card, www.bankrate.com, Dec. 21, 1998, 1 page.
American Bankers Association, The Bank Credit Card Business, (1996).
The Evolution of a New Consumerism, Chain Store Age, vol. 73, Jun. 1997, pp. 8-9.
Nilson, H. Spencer, The Nilson Report, Nov. 1998.
Anonymous, Two Chips Can Be Better Than One, May 2001.
Universal Card free lifetime membership extended 3 months, At&T Marketing, www.att.com/press/0297/970217.csa.html, Dec. 4, 1990, 2 pages.
Yee, Bennet, Using Secure Coprocessors, May 1994.
Swiftgift, Welcome to Swiftgift, www.swiftgiftcard.com, Dec. 8, 1998, 10 pages.
Hargreaves, The Evaluation of the Expanded EBT Demonstration in Maryland, Final Report, May 1994, acs00092018.
Board of Governors of the Federal Reserve System - Report to the Congress on the Application of the Electronic Fund Transfer Act to Electronic Stored-Value Products, May 1997, acs00098020.
Wenninger et al., the Electronic Purse, Current Issues in Economics and Finance, vol. 1, No. 1, Apr. 1995, acs00098037.
Authorization of Financial Agent and Terms of Performance, Debit Card Application for Houston, Texas, Sep. 1991, acs00277412.
Debit Card Services - Invitation for Expressions of Interest, Jul. 1991, acs00277422.
Direct Payment Card, International EBT Pilot Evaluation Pilot Evaluation - Argentina, Jan. 1996, acs00277456.
Modification # 1 to the Authorization of the Financial Agent and Terms of Performance, Sep. 30, 1993, acs00277482.
Modification # 2 to the Authorization of the Financial Agent and Terms of Performance, Mar. 25, 1994, acs00277490.
Modification # 3 to the Authorization of the Financial Agent and Terms of Performance, Feb. 25, 1995, acs00277500.
Modification # 4 to the Authorization of the Financial Agent and Terms of Performance, Apr. 1, 1996, acs00277507.
FOIA # 09-02-12 Responsive Records Book #2, Mar. 12, 2009, acs00277515.
FOIA # 09-02-12 Responsive Records Book #7, Mar. 12, 2009, acs00278754.
FOIA # 09-02-12 Responsive Records Book #11, Mar. 12, 2009, acs00279715.
Sessums, "Unbanked" Citizens Draw Government Attention, vol. 9, No. 4, (1997) acs00280762.
FOIA # 09-02-12 Responsive Records Book #3, Mar. 12, 2009, acs00277531.
FOIA # 09-02-12 Responsive Records Book #5, Mar. 12, 2009, acs00278229.
In Time of Need: A National Strategy for Disaster Response Cards, prepared by JP Morgan Chase, Jan. 26, 2007.

* cited by examiner

SYSTEM AND METHOD FOR CURRENCY SELECTABLE STORED VALUE INSTRUMENT

CROSS REFERENCE TO RELATED APPLICATION

This application is a divisional of U.S. patent application Ser. No. 09/983,901, filed on Oct. 26, 2001 now U.S. Pat. No. 7,313,546.

This application claims the benefit of the filing date of U.S. Provisional application Ser. No. 60/292,528 filed on May 23, 2001.

FIELD OF INVENTION

The invention relates to the field of financial systems, and more particularly to a stored value instrument whose currency may be selected at time of loading, or at other times.

BACKGROUND OF THE INVENTION

A stored value card is a known type of instrument that may be used for purchasing goods or services via electronic payment systems, or for transporting cash value from one location to another. Stored value cards may be distinguished from credit cards and debit cards. Unlike credit or debit cards, for example, a stored value card may locally store a dollar amount or other representation of current value on the card itself. Each time a portion of the value is redeemed, the stored value may be decremented by the amount of redemption. In some stored value card implementations, the stored value card may be disposable—designed to be discarded once the stored value has been exhausted. In other applications, the stored value card may be reloadable. Telephone calling cards, bus fare cards, commuter train fare cards, meal cards and gift cards are all examples of applications that may be implemented as stored value platforms.

In modern society, persons frequently travel from one country to another for business or personal reasons. Moreover, persons often desire to use or send cash equivalents across national borders. Stored value cards that are purchased, or have value loaded, in one country may be physically compatible with card readers in another country. This may be possible, for example, where a single merchant or service provider such as the VISA™ network has implemented a substantially similar system in more than one country. Such a possibility may also be facilitated by industry efforts aimed at standardizing the stored value card-to-reader interfaces. Unfortunately, even where such compatibility exists between the stored value cards and hardware readers, cross-border use may not be possible where the currencies of the two countries are not the same. For example, a card that is loaded with U.S. dollars may not be redeemable for goods, services, or cash where the local currency is in Mexican pesos or other denominations.

Wire services and other types of electronic funds transfer, money orders, bank drafts, and other mechanisms or instruments are also currently used to transport cash or cash equivalents, from one country to another. Unfortunately for the sender and recipient, these alternatives are generally available only at a relatively high transaction cost, and often only at a relatively small number of fixed locations.

These and other drawbacks exist.

SUMMARY OF THE INVENTION

The invention overcoming these and other problems in the art relates to a system and method for a currency selectable stored value instrument, whose currency may be chosen or converted at the time value is loaded, after load but prior to redemption of value, at the time of redemption, or at other times. The stored value instrument may be in the form of a card made from plastic, paper, or other material.

In order to obtain the card, the user can walk into a bank branch and obtain the card directly from a bank teller. Alternatively, the user can obtain the card from equipment adapted to dispense a stored value card. This equipment could be located within a bank branch, at a retail location, or at any other location. As an additional alternative, the user can access a bank branch by a remote method, such as by email, over the Internet, or by phone to obtain the card. The bank or other issuing institution can issue the card directly upon receiving payment from a user. The payment may be in the form of cash, check, or credit card, or can be taken from an existing customer account.

The stored value instrument may be a plastic card with a magnetic stripe, compatible with card readers on Automated Teller machines (ATMs), point of sale (POS) terminals and other hardware. The system may further contain processors, databases and other resources which are a component of, or in communication with, ATMs and other terminals configured to effect currency conversions. One or more databases may store current account value, PINs (personal identification numbers) and other information related to an account or other facility. In one illustrative embodiment, U.S. dollars may be converted to Mexican pesos when the stored value instrument is loaded or read with a card reader, an ATM or a card dispensing machine. A user may subsequently redeem that value for legal tender in pesos it a card reader or an ATM located in Mexico, for example, or for goods or services. The account may be loaded with, or converted to, other desired currencies.

An object of the invention in one regard is to reduce the cost associated with the transfer of cash or cash equivalents across national borders, for instance where a person in the United States wishes to remit cash to family members or others located in Mexico.

Another object of the invention is to make such transfers more convenient for persons sending, receiving, or redeeming cash or cash equivalents.

Another object of the invention is to make the transport of cash or cash equivalents safe and secure from theft, fraud, or other abuses or difficulties.

Another object of the invention is to facilitate the growth of stored value instrument applications in border towns, resort areas, or other locations where travel between nations is widespread.

Yet another object of the invention is to expand business opportunities for banks or other financial institutions that provide currency exchange services. Other objectives may be realized.

BRIEF DESCRIPTION OF THE DRAWINGS

The invention will be described with reference to the accompanying drawings, in which like elements are referenced with like numbers.

DETAILED DESCRIPTION OF PREFERRED EMBODIMENTS

Figure 1:
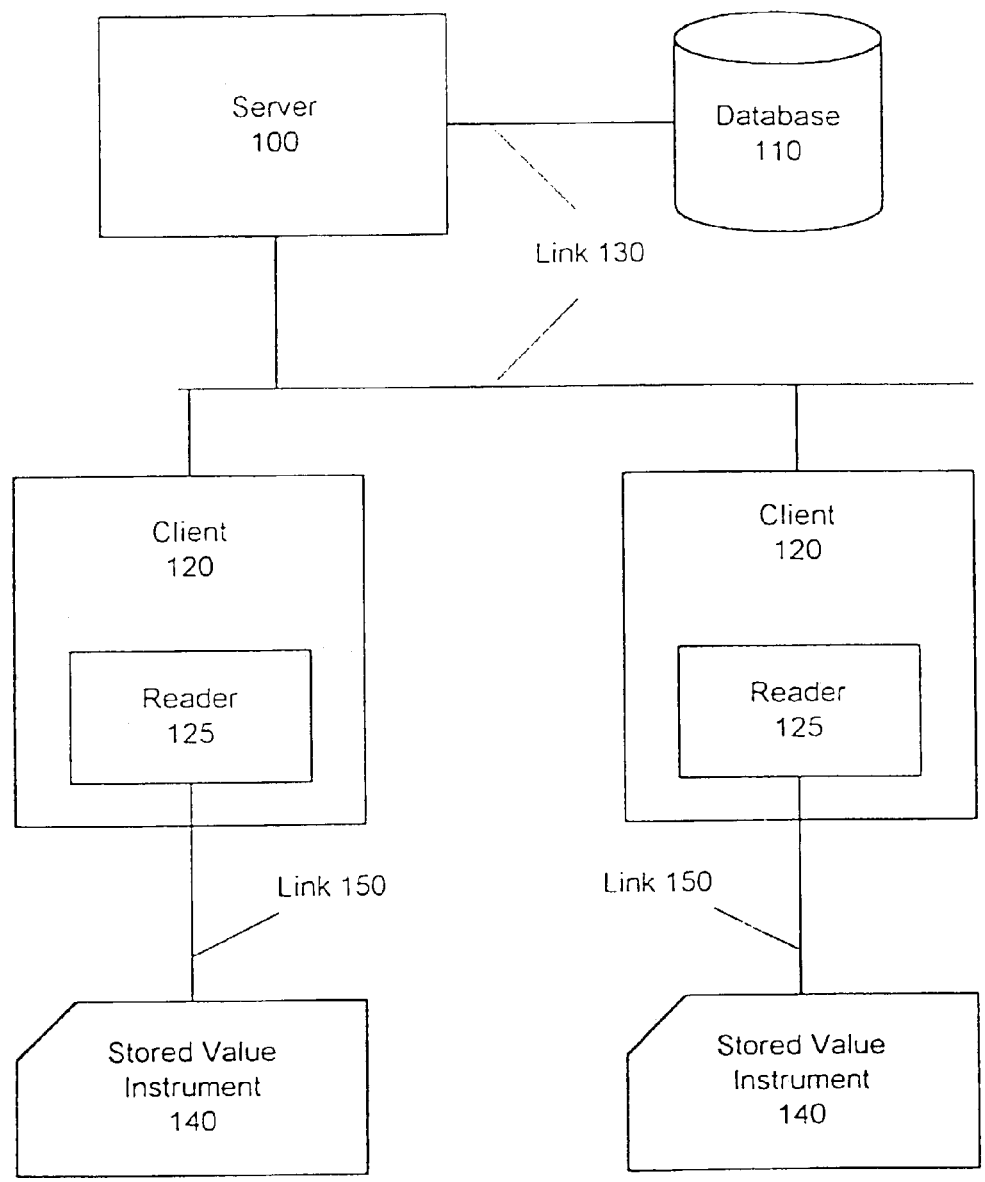
FIG. 1 illustrates a system architecture diagram, according to one embodiment of the invention.

FIG. 1 illustrates an overall architecture of a system through which the invention may be implemented, wherein a server 100 may be linked to clients 120 via a communications link 130. In other embodiments, multiple servers or more than two clients may be deployed. The server 100 may be linked with a database 110 over the communication link 130 as shown. In some embodiments, clients 120 may be configured to perform some or all of processing and storage functions which might otherwise be performed in server 100 and database 110, respectively. Accordingly, in this instance, connection to a server and database would be unnecessary.

Server 100 may host applications facilitating financial transactions for banks, merchants, or other entities. Such applications may be related to the transfer of funds between accounts or facilities, for the conversion of currency, or to perform other functions. Server 100 may be or include, for instance, a workstation running the Microsoft Windows™ NT™, Windows™ 2000, Unix, Linux, Xenix, IBM AIX ™, Hewlett-Packard UX™, Novell Netware™, Sun Microsystems Solaris™, OS/2™, BeOS™, Mach, Apache, OpenStep™ or other operating system or platform.

Additionally, server 100 may interface to database 110. Database 110 may maintain financial account data, currency conversion rates, facilities for the storage of electronic cash, personal identification numbers (PINs) or other information. Database 110 may be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a SAN (Storage Area Network), Microsoft Access™ or others may also be used, incorporated or accessed in the invention.

Clients 120 may include customer terminals located at a bank or other financial institution, or at other convenient locations, for example in the case where the stored value instrument is to be redeemed for cash. Clients 120 may also be located at the point of sale for goods or services. Furthermore, clients 120 may be fixed or portable terminals owned or used by users of the system and method and located at various locations. Clients 120 may be or include, for instance, an ATM (Automated Teller Machine) or other terminal equipped to dispense funds. Clients 120 may also be or include a PC (Personal Computer) running the Microsoft Windows™95, 98, Millenium™, NT™, or 2000, Windows™CE™, PalmOS™, Unix, Linux, Solaris™, OS/2™, BeOS™, MacOS™ or other operating system or platform. Clients 120 may include a microprocessor such as an Intel x86-based device, a Motorola 68K or PowerPC™ device, a MIPS, Hewlett-Packard Precision™, or Digital Equipment Corp Alpha™ RISC processor, an Intel pentium®, pentium® II, pentium® III or pentium® IV processor, a microcontroller or other general or special purpose device operating under programmed control. Clients 120 may furthermore include electronic memory such as RAM (Random Access Memory) or EPROM (Electronically Programmable Read Only Memory), storage such as a hard drive, CDROM or rewritable CDROM or other magnetic, optical or other media, and other associated components connected over an electronic bus, as will be appreciated by persons skilled in the art. Clients 120 may also be or include a network-enabled appliance such as a WebTV™ unit, radio-enabled Palm™ Pilot or similar unit, a set-top box, a networkable game-playing console such as Sony Playstation™ or Saga Dreamcast™, a browser-equipped cellular telephone, or other TCP/IP client or other device. Clients 120 may also be, include or interface to a wired digital or analog telephone, or a wireless digital or analog telephone such as a cellular telephone or a satellite telephone.

Different embodiments of the invention may vary as to the nature of stored value instrument 140. For example, stored value instrument 140 may be a card, which may preferably be fabricated of plastic. Stored value instrument 140 may contain at least one resource for storing data. In one embodiment of the invention, the storage resource may be a magnetic stripe embedded in or attached to stored value instrument 140. In another embodiment, the storage resource may be electronic or magnetic structures in the interior of a stored value instrument. Stored value instrument 140 may also include a processor, for example in a smart card configuration. Moreover, stored value instrument 140 may be physically or electronically configured in a way that is compatible with an industry standard, such as Proton, Mondex, CEPS (Common Electronic Purse Specifications), or other standard familiar to those skilled in the art.

In embodiments where stored value instrument 140 is implemented as a card, clients 120 may also be, include, or interface to readers 125. Readers 125 may be adapted to communicate via link 150 with stored value instrument 140. Together, readers 125 and link 150 may effectuate the transfer of value or other data from a client 120 to stored value instrument 140. Reader 125 and link 150 may also read data from the memory of stored value instrument 140. Some embodiments of the system may include more than two stored value instruments. Link 150 may be consistent with alternative embodiments of communication link 130 described below, with industry standards indicated above, or with other schemes recognized in the art. Alternatively, the stored value instrument 140 is inserted directly into the reader 125, thereby rendering the link 150 an electronic, magnetic, optical, or other type of reading device.

In one embodiment or the invention, stored value instrument 140 may not be or include a card, but rather, stored value instrument 140 may include an index to an account or other facility, for example on database 110, for storing value. In other embodiments, stored value instrument 140 may be or include both a card and an account or other facility, cooperating to execute the functions described herein.

Data stored on or in stored value instrument 140 may include, for example, an account holder's name, account number, a numerical representation of currently stored value, an indication of the type of currency stored on the instrument, a PIN, or other data, or any subset of data utilized by the method or methods disclosed herein.

Server 100, database 110, and clients 120 may communicate via communications link 130. Communications link 130 may be, include or interface to any one or more of, for instance, the Internet, an intranet, a PAN (Personal Area Network), a LAN (Local Area Network), a WAN (Wide Area Network) or a MAN (Metropolitan Area Network), a SAN (Storage Area Network), a frame relay connection, an AIN (Advanced Intelligent Network) connection, a SONET (Synchronous Optical Network) connection, a digital T1, T3, E1 or E3 line, DDS (Digital Data Service) connection, DSL (Digital Subscriber Line) connection, an Ethernet connection, an ISDN (Integrated Services Digital Network) line, a dial-up port such as a V.90, V.34 or V.34 bis analog modem connection, a cable modem, an Asynchronous Transfer Mode connection, or an FDDI (Fiber Distributed Data Interface) or CDDI (Copper Distributed Data Interface). connection. Communications link 130 may furthermore be, include or interface to any one or more of a WAP (Wireless Application Protocol) link, a GPRS (General Packet Radio Service) link, a GSMI (Global System for Mobile Communication) link, a CDMA (Code Division multiple Access) or TDMA (Time Division Multiple Access) link such as a cellular phone channel, a GPS (Global Positioning System) link, CDPD (Cellular Digital Packet Data), a RIM (Research in Motion, Limited) duplex paging type device, a Bluetooth, BlueTeeth or WhiteTooth radio link, or an IEEE 802.11-based radio frequency link. Communications link 130 may yet further be, include or interface to any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection or other wired or wireless, digital or analog interface or connection. Communications link 130 may further be, include, or interface to a PSTN (Public-Switched Telephone Network).

In embodiments of the invention, the type of communication between system components represented by communication link 130 may be implemented in different ways. Moreover, in embodiments, it may not be necessary that all components communicate directly with each other. For example, it may not be necessary that each of clients 120 communicate with each other.

Server 100 and clients 120 may utilize network enabled code in order to facilitate functionality in a network-based environment. Network enabled code may be, include or interface to, for example, Hyper text Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMLL), Wireless Markup Language (WML), Java™, Jini™, C, C++, Perl, UNIX Shell, Visual Basic or Visual Basic Script, Virtual Reality Markup Language (VRML), ColdFusion™, Common Gateway Interface (CGI) or other compilers, assemblers, interpreters or other computer languages or platforms.

Figure 2:
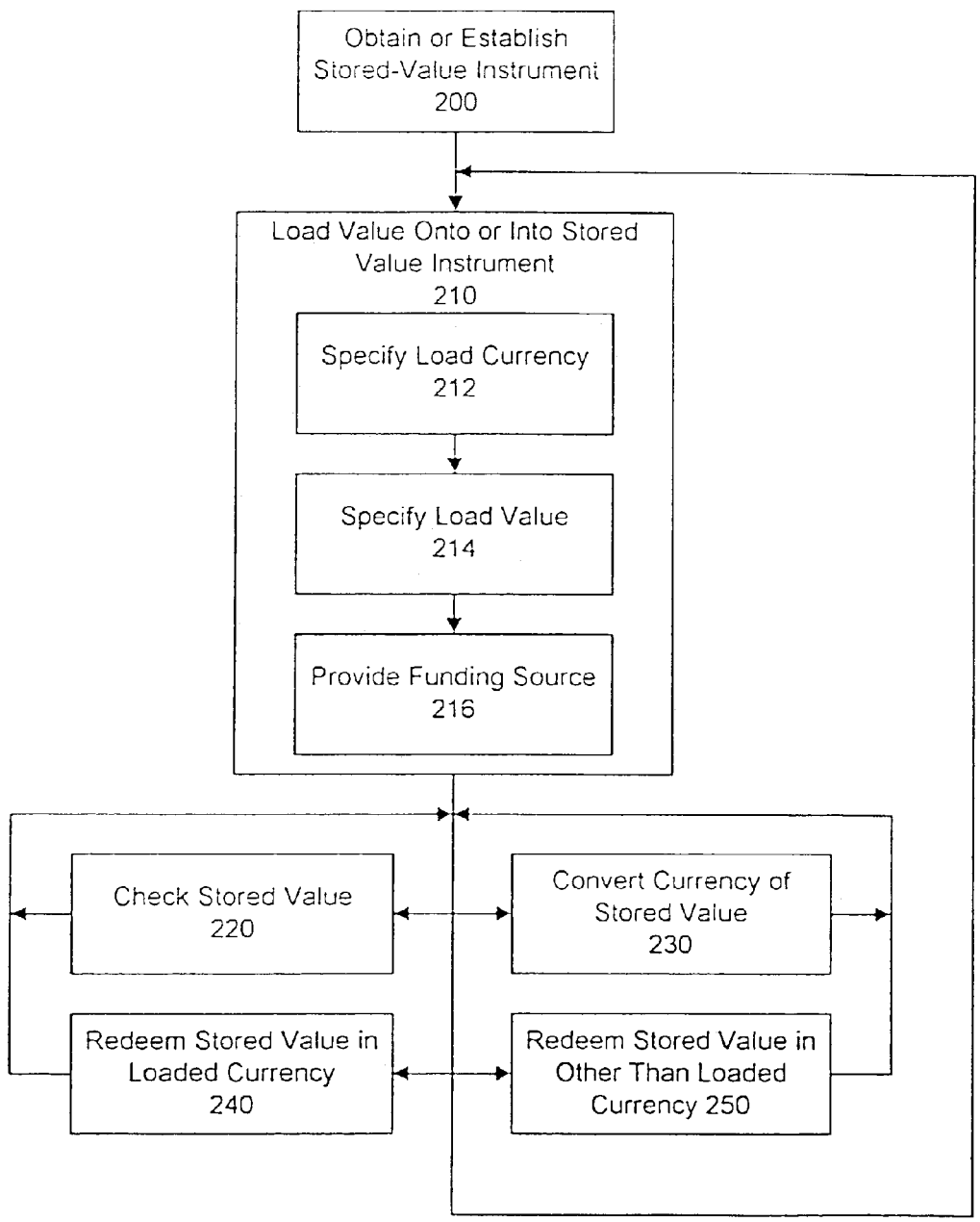
FIG. 2 illustrates a process flow diagram from the perspective of a stored value instrument user, according to one embodiment of the invention.

FIG. 2 is a process flow diagram from the perspective of a stored value instrument user, according to one embodiment of the invention. In step 200, a user may obtain or establish a stored value instrument 140. In one embodiment of the invention, stored value instrument 140 may be obtained or established via remote application in step 200. For example, an application may be sent to a service provider via conventional mail, electronic mail, or a Web-based utility. Alternatively, the application may be submitted in hard copy at a banking or other site. Upon approval, one or more of stored value instrument 140 may be mailed or delivered to the applicant or established on the applicant's behalf. Additionally, in embodiments a PIN may be sent via conventional mail, electronic mail, or other technique, but preferably separate from any mailing or delivery of stored value instrument 140 to that same applicant. Additionally, step 200 may be effectuated by a card dispensing machine, an ATM or other client 120 configured to dispense or establish stored value instrument 140. In embodiments of the invention, stored value instrument 140 may be obtained or established in person, for example from a teller at a bank, financial institution, or other service provider in step 200.

Step 210, loading value onto or into stored value instrument 140, may be performed subsequent to the time that stored value instrument 140 is obtained or established, as illustrated in FIG. 2. In another embodiment of the invention, step 210 may be performed coincident with step 200 obtaining or establishing a stored value instrument 140, in a manner consistent with alternatives previously described. In step 210, a person seeking to load value onto or into stored value instrument 140 may be required to specify, among other things, load currency in step 212, load value in step 214, and a funding source in step 216. In step 212, for instance, a user may specify that value is to be loaded in Mexican pesos, British pounds sterling, German marks, francs, euros, or any other currency or denomination. In step 214, a user may specify the value of the load currency. In one embodiment of the invention, value expressed in step 214 may be in the same currency as the load currency. In another embodiment of the invention, value expressed in step 214 may be in a currency which is other than the load currency. In a case where Mexican pesos are specified as the load currency, and where 520 US dollars are specified as the load value, for instance, stored value instrument 140 may be loaded with 5,000 pesos (if appropriate under the exchange rate at the time of the transaction). In step 216, the owner of the stored value instrument 140 may specify a funding source such as a checking account, savings account, money market account, brokerage account, credit account, or other account from which funds can be drawn. In another embodiment of the invention, a customer may provide actual cash or a credit card in step 216 to provide value for loading onto or into stored value instrument 140.

Like step 200 related to obtaining or establishing a stored value instrument 140, step 210 related to loading value onto or into a stored value instrument 140 may be performed remotely or in person. Remote operation might be implemented, for example, where client 120 is, includes, or interfaces to a wired telephone in communication with a PSTN, a wireless telephone, a PDA, or other wireless device with Internet access, a personal computer with Web access, or an ATM. Moreover, where the transaction is performed remotely, or where the funding source is held by other than the stored value instrument provider, there may be a delay between the time of the load request in step 210, and the availability of funds on or in stored value instrument 140. In another embodiment of step 210, stored value instrument 140 may be loaded in person, for example by a teller at a bank, financial institution, or other service provider.

Figure 3:
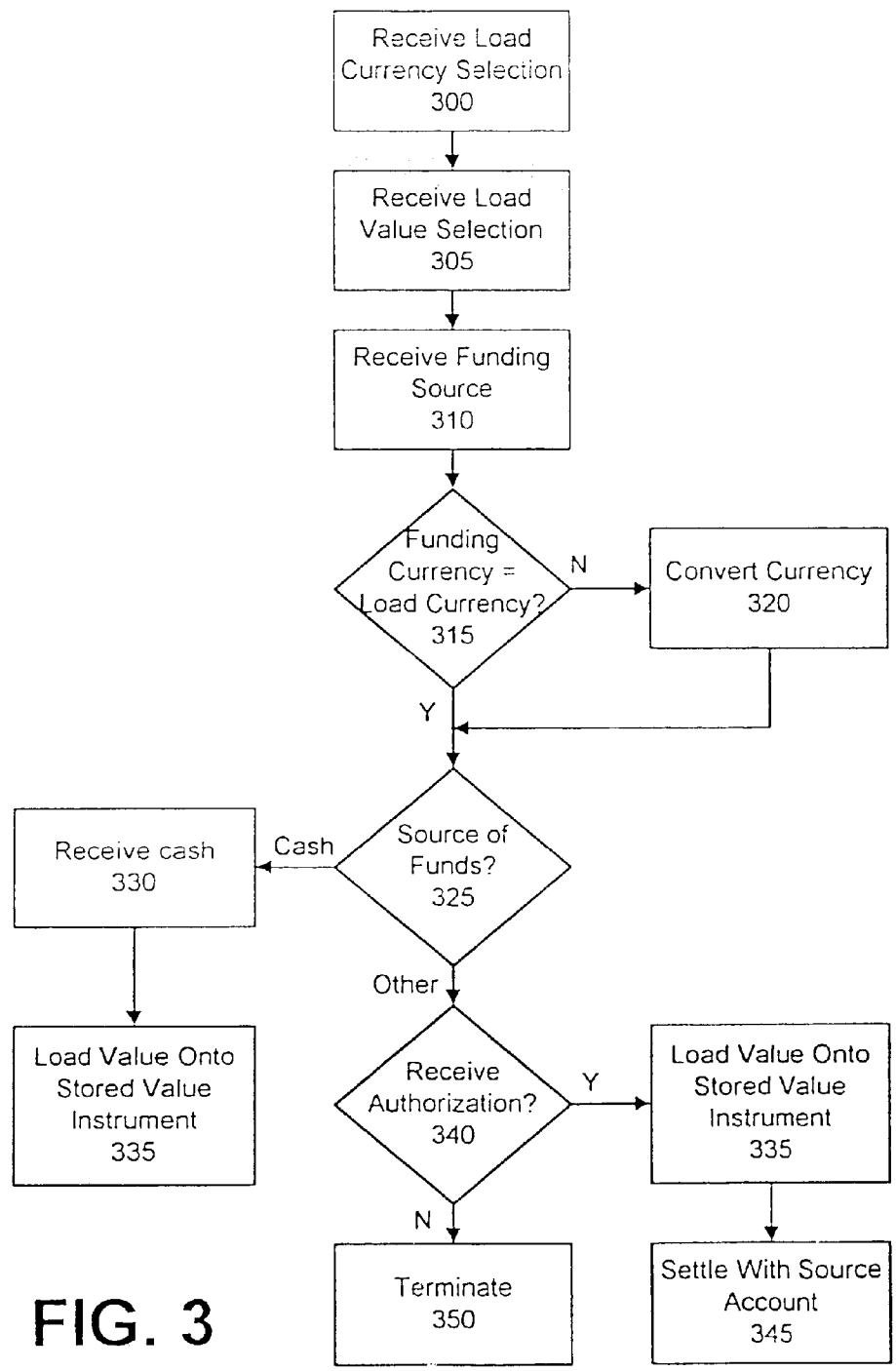
FIG. 3 illustrates a process flow diagram from the perspective of a provider of stored value instrument services, illustrating how value may be loaded onto or into a stored value instrument, according to one embodiment of the invention.

Subsequent processes to effectuate the load of value onto stored value instrument 140 are described in FIG. 3 and the accompanying text.

FIG. 2 illustrates that, once value has been loaded onto or into stored value instrument 140 in step 210, a user of stored value instrument 140 may proceed to at least any of five steps represented by step numbers 210, 220, 230, 240, and 250. Of course, in embodiments of the invention, all alternatives may not be available and in others, further alternatives presented.

A user may load value onto or into stored value instrument 140, in step 210, subsequent to an initial load. In one embodiment, additional value may be loaded in the same currency. In other embodiments, it may be possible in step 210 to load value onto or into stored value instrument 140 in a currency different from what has already been loaded onto or into stored value instrument 140.

In one embodiment of the invention, a fee may be charged at issuance of the card or other instrument in step 200. In another embodiment of the invention, a fee may be charged each time that value is loaded onto the stored value instrument in step 210.

In step 220, a user may check the balance of stored value. In one embodiment, inquiries may be made remotely in step 220, for instance in the same way that balances are checked in conventional bank accounts. In embodiments where stored value instrument 140 is or includes a card, it may be necessary to interface stored value instrument 140 to reader 125 in order to perform step 220. In the instance where stored value instrument 140 is a card containing a magnetic stripe, and where the magnetic stripe contains at least an indication of stored value, it may not be necessary for client 120 to be connected via link 130, since, in one embodiment, client 120 and reader 125 may read the balance of stored value directly from stored value instrument 140. In other embodiments, it may be necessary to the execution of step 220 for client 120 to communicate with server 100 or database 110 over link 130, where, for example, stored value instrument 140 is not or does not include a card containing an indication of stored value, or where stored value instrument 140 is an account or other facility and does not include a card at all. In other embodiments of the invention, a user of stored value instrument 140 may check the remaining value in step 220 by making an in person inquiry at a bank, financial institution, or other service provider.

In step 230, a user of stored value instrument 140 may convert the currency of stored value. An illustration is where Mexican pesos were loaded originally, and a user wishes to convert the currency of the loaded value to British pounds without redeeming value in exchange for goods, services, or cash.

In step 240, a user may redeem some or all of the stored value on or in stored value instrument 140 in the loaded currency. For example, where the stored value is loaded in Mexican pesos, a user may redeem stored value for goods or services in Mexico City, where the local currency is also in pesos, or a user may redeem stored value for cash pesos at a Mexican ATM or card reader.

Figure 4:
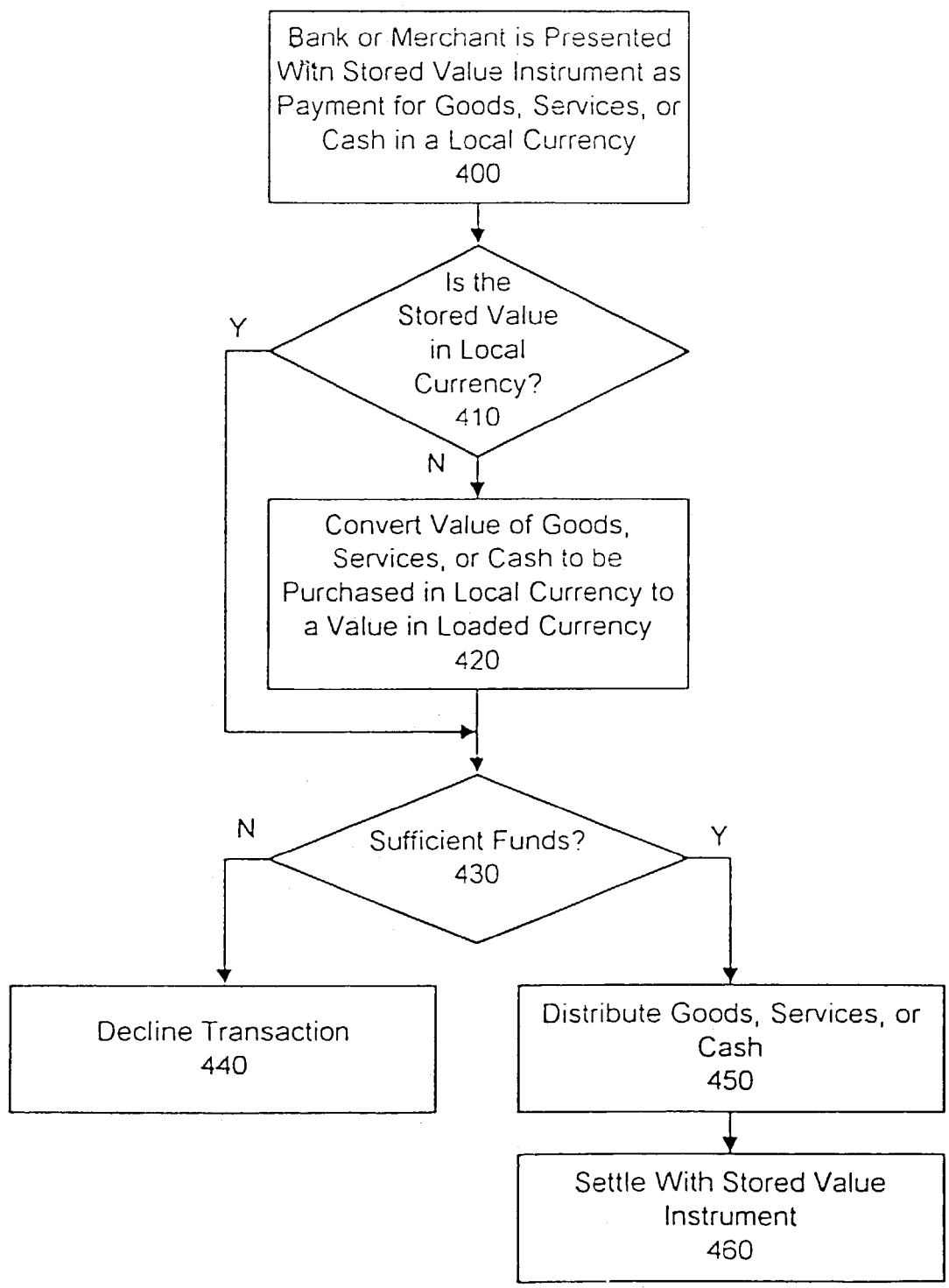
FIG. 4 illustrates a process flow diagram from the perspective of a provider of stored value instrument services, illustrating how value may be redeemed from a stored value instrument, according to one embodiment of the invention.

In step 250, a user may redeem stored value from stored value instrument 140 in other, than the loaded currency. If, for instance, stored value instrument 140 was loaded with value in Mexican pesos in anticipation of a trip to Mexico that was subsequently cancelled, a user may redeem the stored value in exchange for US dollars at an ATM or a card reader in the U.S. A process for effectuating such a request is illustrated in FIG. 4.

In the steps set forth above, the user of the stored value instrument 140 may be the same person who purchased the card, if for instance, the purchaser has traveled to another country which uses different currency. Alternatively, the purchaser may transfer the stored value instrument 140 to an acquaintance in another to thereby easily, efficiently, and securely transport funds between countries.

FIG. 3 is a process flow diagram from the perspective of a provider of stored value instrument services, illustrating how value may be loaded onto or into stored value instrument 140, according to one embodiment of the invention. In steps 300, 305, and 310, the service provider or service provider system may receive the load currency selection, load value selection, and funding source information, respectively. Information in these steps may be the result of user input in step 210, previously described.

In step 315, the service provider or service provider system may decide whether the funding currency is the same as the load currency. If it is, then the process may advance to step 325. If not, for example where the funding source is in US dollars, and Mexican pesos are to be loaded onto stored value instrument 140, then the process may advance to step 320.

In step 320, a calculation may be made to convert the value of load currency into the funding currency. For example, if a user has requested a loaded value of 5,000 pesos, and the funding source is in US dollars, step 320 may calculate that 5,000 pesos is equivalent to 520 US dollars.

In step 325, the service provider or service provider system may resolve the nature of the funding source. If the source of funds is cash, then the cash may be collected in step 330, and the corresponding value may be loaded onto stored value instrument 140 in step 335. In the example immediately above, 520 US dollars in legal tender would be collected, and 5,000 Mexican pesos would be loaded onto or into stored value instrument 140. If, on the other hand, the funding source is a checking, savings, brokerage, credit, or other account, then authorization step 340 may be necessary to verify that the account has sufficient funds before loading value onto or into stored value instrument 140. Where authorization step 340 is able to verify funds, value may be loaded onto or into stored value instrument 140 in step 335, and the bank, financial institution, or other service provider may then settle or otherwise reconcile with the source account in step 345. Where authorization step 340 is unable to verify sufficient funds, the loading process illustrated in FIG. 3 may be terminated in step 350.

FIG. 4 is a process flow diagram from the perspective of a provider of stored value instrument services, illustrating how value may be redeemed from stored value instrument 140, according to one embodiment of the invention. The process may start, in step 400, when a bank, other financial institution, or merchant is presented with a stored value instrument 140 as payment for goods, services, or cash in local currency.

In step 410, the bank, other financial institution, or merchant may check to see whether the stored value is in local currency. In one embodiment, step 410 may be an online transaction that may require communication with a funding source. In another embodiment of step 410, a reader 125 may read an indication of currency from the memory of a stored value instrument 140 that is or includes a card.

If the stored value is in the local currency, then the process may be promoted to step 430; if the stored value is not in local currency, then the process may advance to step 420. In step 420, the value of goods, services, or cash to be purchased in local currency may be converted to the currency of the stored value. For example, if a user is seeking to exchange stored value in the currency of Mexican pesos for 200 British pounds sterling cash, step 420 may calculate that 200 British pounds sterling is equivalent to 2,800 Mexican pesos.

In step 430, the value of goods, services, or cash may be compared to the stored value, in the currency of the stored value. Thus, in the immediately preceding example, it may be decided in step 430 that a stored value instrument 140 loaded with value of 5,000 Mexican pesos would be sufficient funds to purchase 200 British pounds sterling legal tender. Where the stored value funds are sufficient, the requested goods, services, or cash may be distributed in step 450, and, in step 460, the transaction may be settled or otherwise reconciled, for example by transferring 2,800 Mexican pesos from stored value instrument 140 to an account of the bank, other financial institution, or merchant. Of course, if stored value instrument 140 does not have sufficient funds to cover the transaction, then the transaction may be declined in step 440.

The foregoing description of the invention is illustrative, and variations in configuration and implementation will occur to persons skilled in the art. For instance, stored value instrument 140 may be implemented in various physical and electronic formats other than those specifically described. Moreover, while the invention has been described with respect to loading or conversion from one original currency to one converted currency, in embodiments of the invention multiple currencies may be used or selected as originating currency, the currency which is converted into or both. The scope of the invention is accordingly to be limited only by the following claims.

The invention claimed is:

1. A method for redeeming value from a stored value instrument, comprising the steps of:
   a) loading value onto the stored value instrument or onto an account associated with the stored value instrument based upon a user-provided stored value currency, a load value, and a funding source, wherein the load value is obtained from the funding source and the load value is in the stored value currency;
   b) using a computer processor to determine whether a stored value currency is the same as a transaction value currency, wherein the value loaded onto the stored value instrument was designated by an owner or a user of the stored value instrument;
   c) using a computer processor to convert the stored value currency to the transaction value currency if the currencies are different;
   d) determining whether the stored value is sufficient to complete a transaction;
   e) providing value to a redeemer; and
   f) reconciling with the stored value instrument, wherein reconciling comprises transferring value from the stored value instrument to an individual or account associated with the transaction.

2. The method of claim 1, wherein the step of providing value comprises distributing goods.

3. The method of claim 1, wherein the step of providing value comprises distributing services.

4. The method of claim 1, wherein the step of providing value comprises distributing cash.

5. The method of claim 1, wherein the value loaded onto the stored value instrument or onto an account associated therewith is based on a load value and a load currency, and wherein the load currency comprises the stored value currency, each designated by the owner or the user.

6. The method of claim 1 wherein the account associated with the transaction comprises a merchant account.

7. A method for redeeming value from a stored value instrument, comprising the steps of:
   a) loading value onto the stored value instrument or onto an account associated wit the stored value instrument based upon a user-provided stored value currency, a load value, and a funding source, wherein the load value is obtained from the funding source and the load value is in the stored value currency;
   b) using a computer processor to determine whether the stored value currency and a transaction value currency are in the same, wherein the value loaded onto the stored value instrument was designated by an owner or a user of the stored value instrument;
   c) using a computer processor to convert the transaction value currency to the stored value currency if the stored value currency is not the same as the transaction value currency;
   d) determining whether the stored value is sufficient to complete a transaction;
   e) declining the transaction if the stored value is insufficient;
   f) providing value to a redeemer if the stored value is sufficient; and
   g) reconciling with a stored value instrument if the stored value is sufficient, wherein reconciling comprises transferring value from the stored value instrument to an individual or account associated with the transaction.

8. The method of claim 7, wherein step of providing value comprises distributing goods.

9. The method of claim 8, wherein step of providing value comprises distributing services.

10. The method of claim 8, wherein step of providing value comprises the distributing cash.

11. The method of claim 7, wherein the value loaded onto the stored value instrument or onto an account associated therewith is based on a load value and a load currency, and wherein the load currency comprises the stored value currency, each designated by the owner or the user.

12. The method of claim 7 wherein the account associated with the transaction comprises a merchant account.

13. A method for redeeming value from a stored value instrument, comprising the steps of:
   a) loading value onto the stored value instrument or onto an account associated with the stored value instrument based upon a user-provided stored value currency, a load value, and a funding source, wherein the load value is obtained from the funding source and the load value is in the stored value currency;
   b) using a computer processor to determine whether a stored value currency and a transaction value currency are the same, wherein the value loaded onto the stored value instrument was based on a load value and a load currency, each designated by an owner or a user of the stored value instrument;
   c) using a computer processor to convert the transaction value currency to the stored value currency if the stored value currency is not the same as the transaction value currency;
   d) determining whether the stored value is sufficient to complete a transaction;
   e) providing value to a redeemer; and
   f) reconciling with the stored value instrument, wherein reconciling comprises transferring value from the stored value instrument to an individual or account associated with the transaction.

* * * * *